US007012737B2

(12) United States Patent
Iwasaki et al.

(10) Patent No.: US 7,012,737 B2
(45) Date of Patent: Mar. 14, 2006

(54) TWO-DIMENSIONAL OPTICAL DEFLECTOR WITH MINIMIZED CROSSTALK

(75) Inventors: Nobuyoshi Iwasaki, Tachikawa (JP); Yoshitaka Kamiya, Hachioji (JP); Kenji Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/982,648

(22) Filed: Nov. 5, 2004

(65) Prior Publication Data

US 2005/0099709 A1 May 12, 2005

(30) Foreign Application Priority Data

Nov. 10, 2003 (JP) ............................ 2003-379960
Oct. 13, 2004 (JP) ............................ 2004-299203

(51) Int. Cl.
*G02B 26/00* (2006.01)

(52) U.S. Cl. ...................................... 359/298; 359/224

(58) Field of Classification Search ........ 359/223–225, 359/846–849, 871–877
See application file for complete search history.

(56) References Cited

U.S. PATENT DOCUMENTS

| | | | | |
|---|---|---|---|---|
| 5,606,447 | A * | 2/1997 | Asada et al. | 359/199 |
| 5,912,608 | A * | 6/1999 | Asada | 335/222 |
| 6,108,118 | A | 8/2000 | Minamoto | 359/224 |
| 6,388,789 | B1 * | 5/2002 | Bernstein | 359/198 |
| 6,404,313 | B1 * | 6/2002 | Asada | 335/222 |
| 2002/0149294 | A1 * | 10/2002 | Matsumoto et al. | 310/309 |

* cited by examiner

*Primary Examiner*—Drew A. Dunn
*Assistant Examiner*—Mark Consilvio
(74) *Attorney, Agent, or Firm*—Scully, Scott, Murphy & Presser

(57) ABSTRACT

An optical deflector includes a support, a frame-like outer movable plate positioned inside the support, two outer torsion bars connecting the support and outer movable plate, an inner movable plate positioned inside the outer movable plate, two inner torsion bars connecting the outer movable plate and inner movable plate, an outer driving coil on the outer movable plate, an outer movable plate driving magnetic field generator, an inner driving coil on the inner movable plate, an inner movable plate driving magnetic field generator, an outer driving coil wiring electrically connected to the outer driving coil, and an inner driving coil wiring electrically connected to the inner driving coil. The inner driving coil wiring extends on the outer movable plate so as to avoid a magnetic field generated by the outer movable plate driving magnetic field generator.

4 Claims, 9 Drawing Sheets

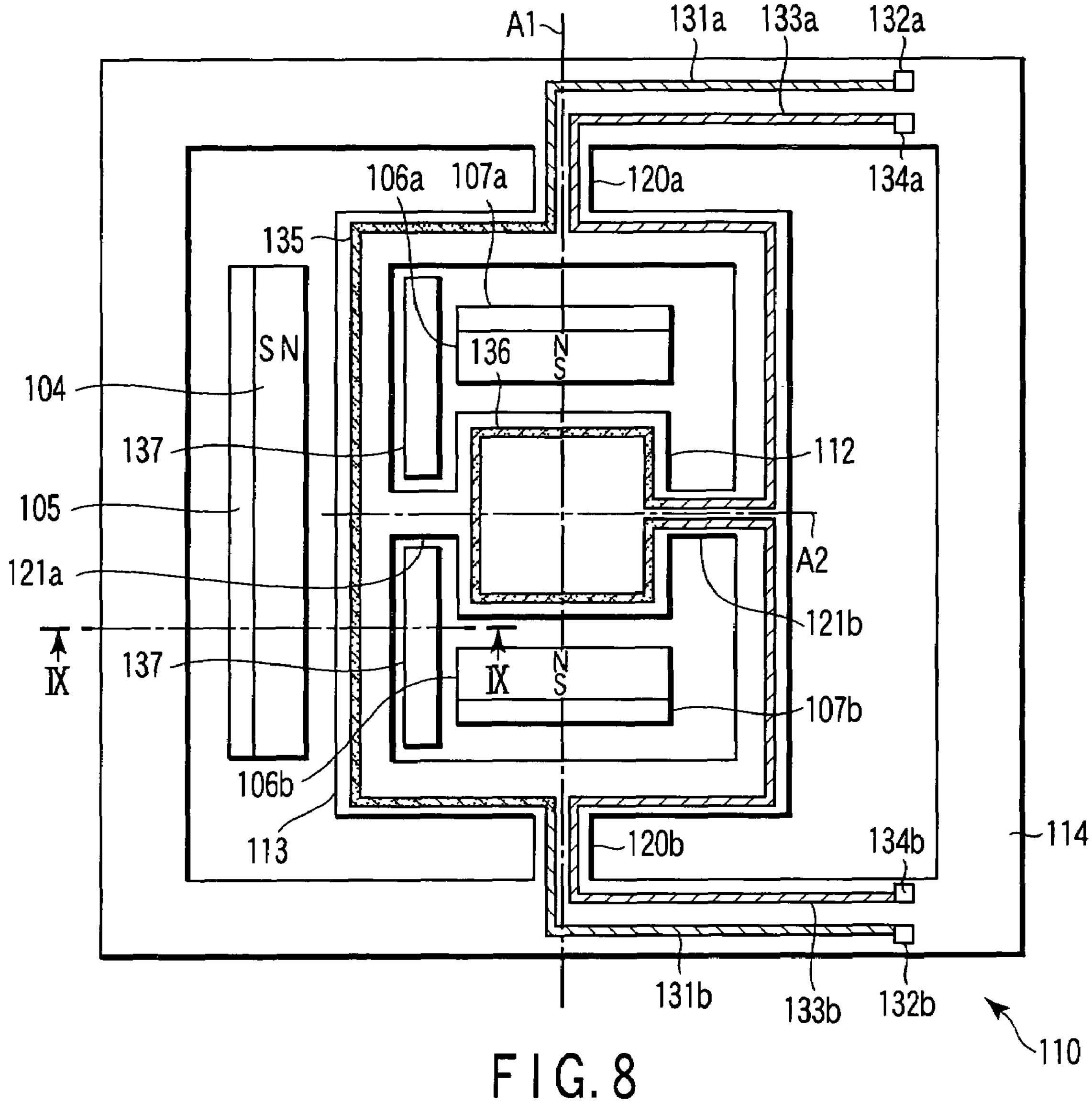
F I G. 8
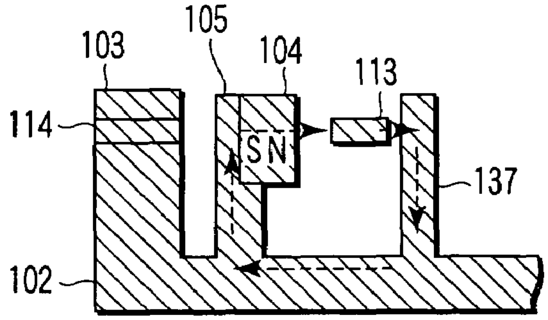
F I G. 9

TWO-DIMENSIONAL OPTICAL DEFLECTOR WITH MINIMIZED CROSSTALK

CROSS-REFERENCE TO RELATED APPLICATIONS

This application is based upon and claims the benefit of priority from the prior Japanese Patent Applications No. 2003-379960, filed Nov. 10, 2003; and No. 2004-299203, filed Oct. 13, 2004, the entire contents of both of which are incorporated herein by reference.

BACKGROUND OF THE INVENTION

1. Field of the Invention

The present invention relates to a two-dimensional optical deflector.

2. Description of the Related Art

U.S. Pat. No. 6,108,118 discloses an electromagnetic-driven two-dimensional optical deflector. As shown in FIG. 15, in this optical deflector, a support 403 is connected to an outer movable plate 401*a* through an outer torsion bar 402*a*, and the outer movable plate 401*a* is connected to an inner movable plate 401*b* through an inner torsion bar 402*b*. The outer torsion bar 402*a* and inner torsion bar 402*b* extend perpendicular to each other. The outer movable plate 401*a* is provided with an outer driving coil 404*a*. Part of an outer driving coil wiring extending from the outer driving coil 404*a* extends to an electrode on the support 403. The inner movable plate 401*b* is provided an inner driving coil 404*b*. Part of an inner driving coil wiring extending from the inner driving coil 404*b* extends to an external electrode (an electrode on the outer torsion bar 402*a* in FIG. 15) via on the outer movable plate 401*a*.

In order to make magnetic fields act on the outer driving coil 404*a* and inner driving coil 404*b*, two permanent magnets 407*a* for driving the outer movable plate are arranged on two sides of the outer movable plate 401*a*, and two permanent magnets 407*b* for driving the inner movable plate are arranged on two sides of the inner movable plate 401*b*. The two permanent magnets 407*b* are fixed to yokes 418. By supplying proper AC currents to the outer driving coil 404*a* and inner driving coil 404*b*, the inner movable plate 401*b* is oscillated on the outer torsion bar 402*a* and inner torsion bar 402*b* serving as rotation axes. This makes it possible to two-dimensionally deflect a light beam reflected by the inner movable plate 401*b*.

The outer movable plate 401*a* is provided with a Hall element 411*a* for the detection of a deflection angle. A Hall element wiring 409*a* extending from the Hall element 411*a* extends to an electrode on the support 403. The inner movable plate 401*b* is provided with a Hall element 411*b* for the detection of a deflection angle. A Hall element wiring 409*b* extending from the Hall element 411*b* extends to an external electrode (an electrode on the outer torsion bar 402*a* in FIG. 15) via on the outer movable plate 401*a*.

BRIEF SUMMARY OF THE INVENTION

An electromagnetic-driven two-dimensional optical deflector according to the present invention includes a support, a frame-like outer movable plate positioned inside the support, two outer torsion bars (first and second outer torsion bars) connecting the support to the outer movable plate, an inner movable plate positioned inside the outer movable plate, and two inner torsion bars (first and second inner torsion bars) connecting the outer movable plate to the inner movable plate. The inner movable plate includes a reflecting surface. The optical deflector has first and second axes, which are substantially perpendicular to each other. The two outer torsion bars extend along the first axis. The two inner torsion bars extend along the second axis. The outer torsion bars are capable of twisting about the first axis, so as to allow the outer movable plate to oscillate about the first axis with respect to the support. The inner torsion bars are capable of twisting about the second axis, so as to allow the inner movable plate to oscillate about the second axis with respect to the outer movable plate. This allows the direction of the reflecting surface of the inner movable plate to be two-dimensionally changed. The optical deflector further includes an outer driving coil provided on the outer movable plate, an outer movable plate driving magnetic field generator that generates a magnetic field that is substantially parallel to the second axis and crosses the outer movable plate, an inner driving coil provided on the inner movable plate, an inner movable plate driving magnetic field generator that generates a magnetic field that is substantially parallel to the first axis and crosses the inner movable plate, an outer driving coil wiring electrically connected to the outer driving coil, and an inner driving coil wiring electrically connected to the inner driving coil. The inner driving coil wiring extends on the outer movable plate so as to avoid the magnetic field generated by the outer movable plate driving magnetic field generator.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the present invention.

FIG. 8 is a sectional view of an optical deflector according to a modification to the second embodiment of the present invention, showing a cross-section similar to that of FIG. 2;

FIG. 9 is a sectional view taken along a line IX—IX of the optical deflector in FIG. 8;

DETAILED DESCRIPTION OF THE INVENTION

The embodiments of the present invention will be described below with reference to the views of the accompanying drawing.

First Embodiment

Figure 1:
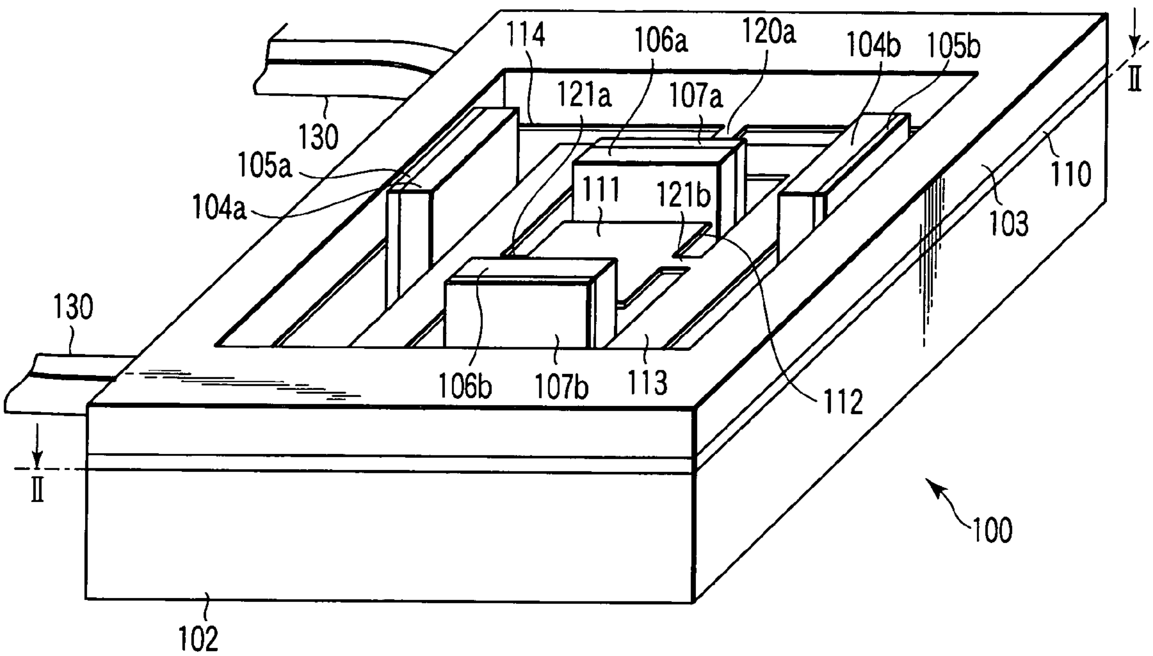
FIG. 1 is a perspective view of an optical deflector according to the first embodiment of the present invention.
Figure 2:
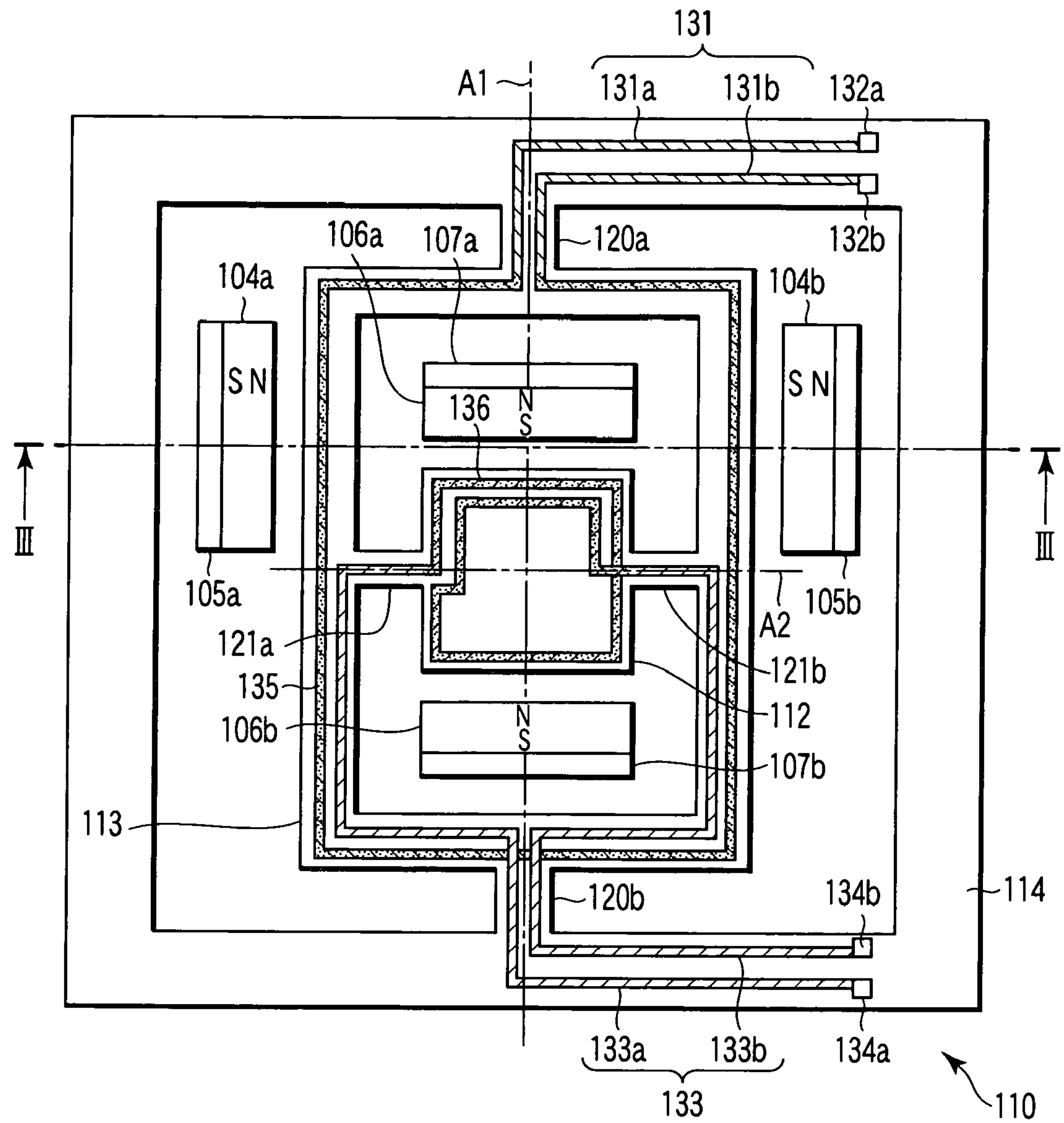
FIG. 2 is a sectional view taken along a line II—II of the optical deflector in FIG. 1.
Figure 3:
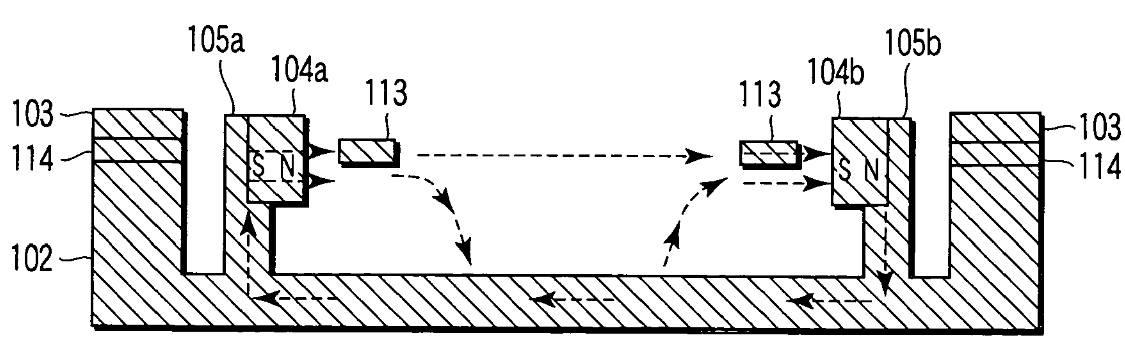
FIG. 3 is a sectional view taken along a line III—III of the optical deflector in FIG. 2.

FIG. 1 is a perspective view of an optical deflector according to the first embodiment of the present invention. FIG. 2 is a sectional view taken a line II—II of the optical deflector in FIG. 1. FIG. 2 schematically shows driving coils and wirings to show their layout, although the driving coils and wirings are not actually seen because they are provided on the lower surface. FIG. 3 is a sectional view taken along a line III—III of the optical deflector in FIG. 2.

As shown in FIG. 1, a two-dimensional optical deflector 100 includes a lower base 102, upper base 103, and scanner substrate 110. The scanner substrate 110 includes an inner movable plate 112, outer movable plate 113, and frame 114. The frame 114 is coupled to the outer movable plate 113 through outer torsion bars 120*a* and 120*b*. The outer movable plate 113 is coupled to the inner movable plate 112 through inner torsion bars 121*a* and 121*b*, which are generally perpendicular to the outer torsion bars 120*a* and 120*b*. The outer movable plate 113 and inner movable plate 112 can be oscillated on the outer torsion bars 120*a* and 120*b*, and the inner torsion bars 121*a* and 121*b*, as axes respectively. The frame 114 of the scanner substrate 110 is joined to the upper base 103.

That is, as shown in detail in FIG. 2, the scanner substrate 110 includes the frame 114, which is a frame-like support, the frame-like outer movable plate 113 located inside the frame 114, the two outer torsion bars (first and second outer torsion bars 120*a* and 120*b*) connecting the frame 114 to the outer movable plate 113, the inner movable plate 112 located inside the outer movable plate 113, and the two inner torsion bars (first and second inner torsion bars 121*a* and 121*b*) connecting the outer movable plate 113 to the inner movable plate 112.

As shown in FIG. 1, the inner movable plate 112 has a reflecting surface 111 on its upper surface. The upper surface of the inner movable plate 112 is one of the two largest parallel flat surfaces, which corresponds to the obverse side in FIG. 1 and is seen. Referring to FIG. 1, the surface corresponding to the reverse side is hidden and cannot be seen is referred to as the lower surface.

As shown in FIG. 2, both the two outer torsion bars 120*a* and 120*b* extend on generally straight lines along the a first axis A1. The two inner torsion bars 121*a* and 121*b* extend on generally straight lines along a second axis A2. The first and second axes A1 and A2 are generally perpendicular to each other. The outer torsion bars 120*a* and 120*b* can be twisted and deformed about the first axis A1 to allow the outer movable plate 113 to oscillate about the first axis A1 with respect to the frame 114. The inner torsion bars 121*a* and 121*b* can be twisted and deformed about the second axis A2 to allow the inner movable plate 112 to oscillate about the second axis A2 with respect to the outer movable plate 113. This allows the direction of the reflecting surface 111 of the inner movable plate 112 to be two-dimensionally changed. The two-dimensional optical deflector 100 can two-dimensionally deflect the light beam reflected by the reflecting surface 111. In general, the first axis A1 is selected as an oscillation axis on the low-speed side, and the second axis A2 is selected as an oscillation axis on the high-speed side.

The scanner substrate 110 further includes an outer driving coil 135 provided on the outer movable plate 113, an outer driving coil wiring 131 electrically connected to the outer driving coil 135, an inner driving coil 136 provided on the inner movable plate 112, and an inner driving coil wiring 133 electrically connected to the inner driving coil 136.

The outer driving coil 135 and outer driving coil wiring 131 constitute one wiring pattern. The inner driving coil 136 and inner driving coil wiring 133 constitute another wiring pattern. That is, the outer driving coil 135 and outer driving coil wiring 131 are both part of one wiring pattern, and the inner driving coil 136 and inner driving coil wiring 133 are both part of another wiring pattern.

In this specification, of the wiring pattern including the outer driving coil 135 and outer driving coil wiring 131, a portion located on the outer movable plate 113 is referred to as a driving coil, and the remaining portion will be referred to as an outer driving coil wiring. Likewise, of the wiring pattern including the inner driving coil 136 and inner driving coil wiring 133, a portion located on the inner movable plate 112 will be referred to as a driving coil, and the remaining portion will be referred to as an inner driving coil wiring.

The lower base 102 is made of a magnetic material and also serves as a yoke forming a magnetic circuit. The lower base 102 is provided with two permanent magnets 104*a* and 104*b* and another pair of permanent magnets 106*a* and 106*b*. The lower base 102 includes two members (back yokes) 105*a* and 105*b*, which respectively hold the permanent magnets 104*a* and 104*b*, and other two members (back yokes) 107*a* and 107*b*, which respectively hold the other permanent magnets 106*a* and 106*b*.

The back yokes 105*a* and 105*b* are respectively located behind the permanent magnets 104*a* and 104*b* with respect to the outer movable plate 113, and cause the magnetic fluxes of the permanent magnets 104*a* and 104*b* to flow. The permanent magnets 104*a* and 104*b* are joined to the back yokes 105*a* and 105*b* such that the magnetization directions become perpendicular to the joint surfaces between the back yokes 105*a* and 105*b* and the permanent magnets 104*a* and 104*b*. The polarities of the permanent magnets 104*a* and 104*b* are oriented in the same direction.

The back yokes 107*a* and 107*b* are respectively located behind the permanent magnets 106*a* and 106*b* with respect to the inner movable plate 112, and cause the magnetic fluxes of the permanent magnets 106*a* and 106*b* to flow. The permanent magnets 106*a* and 106*b* are joined to the back yokes 107*a* and 107*b* such that the magnetization directions become perpendicular to the joint surfaces between the back yokes 107*a* and 107*b* and the permanent magnets 106*a* and 106*b*. The polarities of the permanent magnets 106*a* and 106*b* are oriented in the same direction.

The permanent magnets 104*a* and 104*b* and the back yokes 105*a* and 105*b* are located between the frame 114 and the outer movable plate 113. The permanent magnets 106*a* and 106*b* and the back yokes 107*a* and 107*b* are located between the outer movable plate 113 and inner movable plate 112 of the scanner substrate 110. In other words, the lower base 102 and the scanner substrate 110 joined to the upper base 103 are joined to each other so as to be positioned in this manner.

The permanent magnets 104*a* and 104*b* and the back yokes 105*a* and 105*b* constitute outer movable plate driving magnetic field generating means or an outer movable plate driving magnetic field generator for generating a magnetic field that is substantially parallel to the second axis A2 and crosses the outer movable plate 113. The permanent magnets 106*a* and 106*b* and the back yokes 107*a* and 107*b* constitute inner movable plate driving magnetic field generating means or an inner movable plate driving magnetic field generator for generating a magnetic field that is substantially parallel to the first axis A1 and crosses the inner movable plate 112.

The relationship between the driving coils, the wirings, and the permanent magnets in this embodiment will be described in detail next with reference to FIG. 2.

The outer driving coil wiring 131, which supplies a current to the outer driving coil 135 of the outer movable plate 113, is connected to electrode pads 132*a* and 132*b* on the frame 114 through the outer torsion bar 120*a* and frame 114. The outer driving coil wiring 131 is also connected to drive power supplies (not shown) through lead wires 130 (see FIG. 1) joined to the electrode pads 132*a* and 132*b* by soldering or the like.

More specifically, the outer driving coil 135 starts to extend from the connecting portion between the outer torsion bar 120*a* and the outer movable plate 113, runs around on the outer movable plate 113, and returns to the same connecting portion. The outer driving coil wiring 131 runs on the outer torsion bar 120*a* and frame 114 and is connected to the electrode pads 132*a* and 132*b*. Note that the outer driving coil 135 makes at least one turn on the outer movable plate 113.

More specifically, the outer driving coil 135 extends from the coupling portion between the outer movable plate 113 and the first outer torsion bar 120*a*, runs around on the outer movable plate 113, and extends to the coupling portion between the outer movable plate 113 and the first outer torsion bar 120*a*. It suffices if the outer driving coil 135 makes at least one turn on the outer movable plate 113. That is, although the outer driving coil 135 makes one turn on the outer movable plate 113 in FIG. 2, the coil may makes two or more turns on the outer movable plate.

The outer driving coil wiring 131 includes two wiring portions 131*a* and 131*b* respectively extending from the two ends of the outer driving coil 135. Both the wiring portions 131*a* and 131*b* extend to the frame 114 through the outer torsion bar 120*a*. The end portions of the wiring portions 131*a* and 131*b* are electrically connected to the electrode pads 132*a* and 132*b* on the frame 114, respectively.

The inner driving coil wiring 133, which supplies a current to the inner driving coil 136 of the inner movable plate 112, is connected to electrode pads 134*a* and 134*b* on the frame 114 via the inner torsion bars 121*a* and 121*b*, the outer movable plate 113, the outer torsion bar 120*b* (the outer torsion bar through which the outer driving coil wiring 131 does not run), and the frame 114. The inner driving coil wiring 133 is also connected to drive power supplies (not shown) through the lead wires 130 (see FIG. 1) joined to the electrode pads 134*a* and 134*b* by soldering or the like.

More specifically, an inner driving coil wiring 133*a* extends from the electrode pad 134*a* placed on the frame 114 at a position where it faces the electrode pad 132*a*, runs on the frame 114, runs through the outer torsion bar 120*b* on which the outer driving coil wiring 131 is not formed, runs on the outer movable plate 113, runs through the inner torsion bar 121*a*, and is connected to one end of the inner driving coil 136 on the inner movable plate 112. The inner driving coil 136 runs around (makes one and half turns in FIG. 2) on the inner movable plate 112. The inner driving coil wiring 133*b* connected to the other end of the inner driving coil 136 runs through the inner torsion bar 121*b*, runs on the outer movable plate 113, runs again through the same outer torsion bar 120*b*, runs on the frame 114, and is then connected to the electrode pad 134*b*.

More specifically, the inner driving coil 136 extends from the coupling portion between the inner movable plate 112 and the inner torsion bar 121*a*, runs around on the inner movable plate 112, and extends to the coupling portion between the inner movable plate 112 and the second inner torsion bar 121*b*. It suffices if the inner driving coil 136 makes at least one and half turns on the inner movable plate 112. That is, although the inner driving coil 136 makes one and half turns on the inner movable plate 112 in FIG. 2, the coil may make an integral number of turns. That is, the inner driving coil 136 may make n (n is a natural number) and half turns on the inner movable plate 112.

The inner driving coil wiring 133 includes the first wiring portion 133*a* extending from one end portion of the inner driving coil 136 and the second wiring portion 133*b* extending from the other end portion of the inner driving coil 136. The first wiring portion 133*a* runs through the first inner torsion bar 121*a*, makes generally a quarter turn on the outer movable plate 113, and extends to the frame 114 trough the second outer torsion bar 120*b*. The second wiring portion 133*b* runs through the second inner torsion bar 121*b*, makes an generally quarter turn on the outer movable plate 113, and extends to the frame 114 through the second outer torsion bar 120*b*. The inner driving coil wiring 133 is therefore located on the lower portion (second portion), of the two portions (first and second portions) of the outer movable plate 113 divided into two portions with reference to the second axis A2, which is located on the second outer torsion bar 120*b* side. The end portions of the first and second wiring portions 133*a* and 133*b* are electrically connected to the electrode pads 134*a* and 134*b* on the frame 114, respectively.

The two permanent magnets 104*a* and 104*b* for driving the outer movable plate are joined to the back yokes 105*a* and 105*b* and arranged between the frame 114 and the outer movable plate 113. In addition, the permanent magnets 104*a* and 104*b* are arranged, on that portion (on the upper side in FIG. 2), of the outer movable plate 113 on which only the outer driving coil 135 is placed, such that a line perpendicular to the magnetization direction (for example, the direction in which, as shown in FIGS. 2 and 3, the back yoke side and outer movable plate 113 side of the permanent magnet 104*a* on the left side in FIGS. 2 and 3 become the S pole and N pole, respectively, and the back yoke side and outer movable plate 113 side of the permanent magnet 104*b* on the right side become the N pole and S pole, respectively) becomes generally parallel to an axis (first axis A1) connecting the outer torsion bars 120*a* and 120*b*.

That is, the permanent magnets 104*a* and 104*b* and the back yokes 105*a* and 105*b* are located outside, along the second axis A2, the upper side portion (first portion), of the two portions (first and second portions) of the outer movable plate 113 divided into two portions with reference to the second axis A2, which is located on the first outer torsion bar 120*a* side. The opposing surfaces of the permanent magnets 104*a* and 104*b* and back yokes 105*a* and 105*b* extend generally parallel to those portions of the outer driving coil 135 that extend generally parallel to the first axis A1. As is obvious from the above description, the magnetization directions of the permanent magnets 104*a* and 104*b* coincide with each other, which are both generally parallel to the second axis A2.

The two permanent magnets 106*a* and 106*b* for driving the inner movable plate are joined to the back yokes 107*a* and 107*b* and arranged between the outer movable plate 113 and the inner movable plate 112. In addition, the permanent magnets 106*a* and 106*b* are arranged such that a line perpendicular to the magnetization direction (for example, the direction in which, as shown in FIG. 2, the back yoke side and inner movable plate 112 side of the permanent magnet 106*a* on the upper side in FIG. 2 become the N pole and S pole, respectively, and the back yoke side and inner movable plate 112 side of the permanent magnet 106*b* on the lower side become the S pole and N pole, respectively) becomes generally parallel to an axis connecting the inner torsion bars 121*a* and 121*b*.

That is, the permanent magnets 106*a* and 106*b* and the back yokes 107*a* and 107*b* are located outside the inner movable plate 112 along the first axis A1. In addition, the opposing surfaces of the permanent magnets 106*a* and 106*b* and back yokes 107*a* and 107*b* extend generally parallel to those portions of the inner driving coil 136 that extend generally parallel to the second axis A2. As is obvious from the above description, the magnetization directions of the permanent magnets 106*a* and 106*b* coincide with each other, which are both generally parallel to the first axis A1.

The operation of the optical deflector according to this embodiment will be described next.

The drive power supply (not shown) applies voltages to the electrode pads 132*a* and 132*b*. When, for example, a light beam is to be scanned by the two-dimensional optical deflector 100, AC voltages are applied to the electrode pads 132*a* and 132*b*. When voltages are applied to the electrode pads 132*a* and 132*b*, AC currents flow in the outer driving coil wiring 131 and outer driving coil 135. The outer movable plate 113 oscillates on the outer torsion bars 120*a* and 120*b* as axes, i.e., about the first axis A1, owing to the Lorentz force generated by the interaction between the current flowing in the outer driving coil 135 and the magnetic fields of the permanent magnets 104*a* and 104*b* (the directions of magnetic flux lines are indicated by the dotted arrows in FIG. 3). Likewise, AC voltages are applied to the electrode pads 134*a* and 134*b*. As a consequence, AC currents flow in the inner driving coil wiring 133 and inner driving coil 136. The inner movable plate 112 oscillates on the inner torsion bars 121*a* and 121*b* as axes, i.e., about the second axis A2, owing to the Lorentz force generated by the interaction between the current flowing in the inner driving coil 136 and the magnetic fields of the permanent magnets 106*a* and 106*b*.

When a light beam is to be deflected in a predetermined direction by the two-dimensional optical deflector 100, constant voltages are applied to the electrode pads 132*a* and 132*b*. Upon application of the voltages to the electrode pads 132*a* and 132*b*, DC currents flow in the outer driving coil wiring 131 and outer driving coil 135. Lorentz force is generated by the interaction between the current flowing in the outer driving coil 135 and the magnetic fields of the permanent magnets 104*a* and 104*b* (the directions of magnetic flux lines are indicated by the dotted arrows in FIG. 3). Owing to the Lorentz force, the outer movable plate 113 tilts on the outer torsion bars 120*a* and 120*b* as axes, i.e., tilts about the first axis A1. Likewise, upon application of constant voltages to the electrode pads 134*a* and 134*b*, DC currents flow in the inner driving coil wiring 133 and inner driving coil 136. Lorentz force is generated by the interaction between the current flowing in the inner driving coil 136 and the magnetic fields of the permanent magnets 106*a* and 106*b*. Owing to the Lorentz force, the inner movable plate 112 tilts on the inner torsion bars 121*a* and 121*b* as axes, i.e., tilts about the second axis A2.

In the two-dimensional optical deflector 100, in brief, the inner driving coil wiring 133 extends on the outer movable plate 113 so as to avoid the magnetic fields generated by the permanent magnets 104*a* and 104*b*. In other words, the inner driving coil wiring 133 is placed on those portions, of the outer movable plate 113, which are generally parallel to an axis (first axis A1) connecting the outer torsion bars 120*a* and 120*b* and do not face the permanent magnets 104*a* and 104*b* for driving the outer movable plate. For this reason, the magnetic fields generated by the permanent magnets 104*a* and 104*b* do not act on the inner driving coil wiring 133. The outer movable plate 113 is therefore driven without being affected by the current flowing in the inner driving coil wiring 133. That is, the outer movable plate 113 and inner movable plate 112 can be driven independently of each other.

Although the inner driving coil wiring 133 connected to the inner driving coil 136 for driving the inner movable plate 112 runs on the outer movable plate 113, the wiring runs through the portions that are not easily affected by the magnetic fields of the permanent magnets 104*a* and 104*b*. Therefore, the Lorentz force acting on the outer movable plate 113 is generated by only the interaction between the current flowing in the outer driving coil 135 and the magnetic fields of the permanent magnets 104*a* and 104*b*. This makes it possible to accurately drive the outer movable plate 113 in the two-dimensional driving operation of driving both the inner movable plate 112 and the outer movable plate 113. In other words, these plates can be two-dimensionally driven independently of each other without much influence of drive crosstalk. In addition, since the permanent magnets 104*a* and 104*b* are positioned symmetrically with respect to the first axis A1, the magnetic fields of the permanent magnets 104*a* and 104*b* symmetrically act on the outer driving coil 135 on the outer movable plate 113 with respect to the first axis A1. This makes it hard to cause offset driving of the outer movable plate 113. Therefore, unnecessary resonance or the like does not easily occur.

Modification

Figure 4:
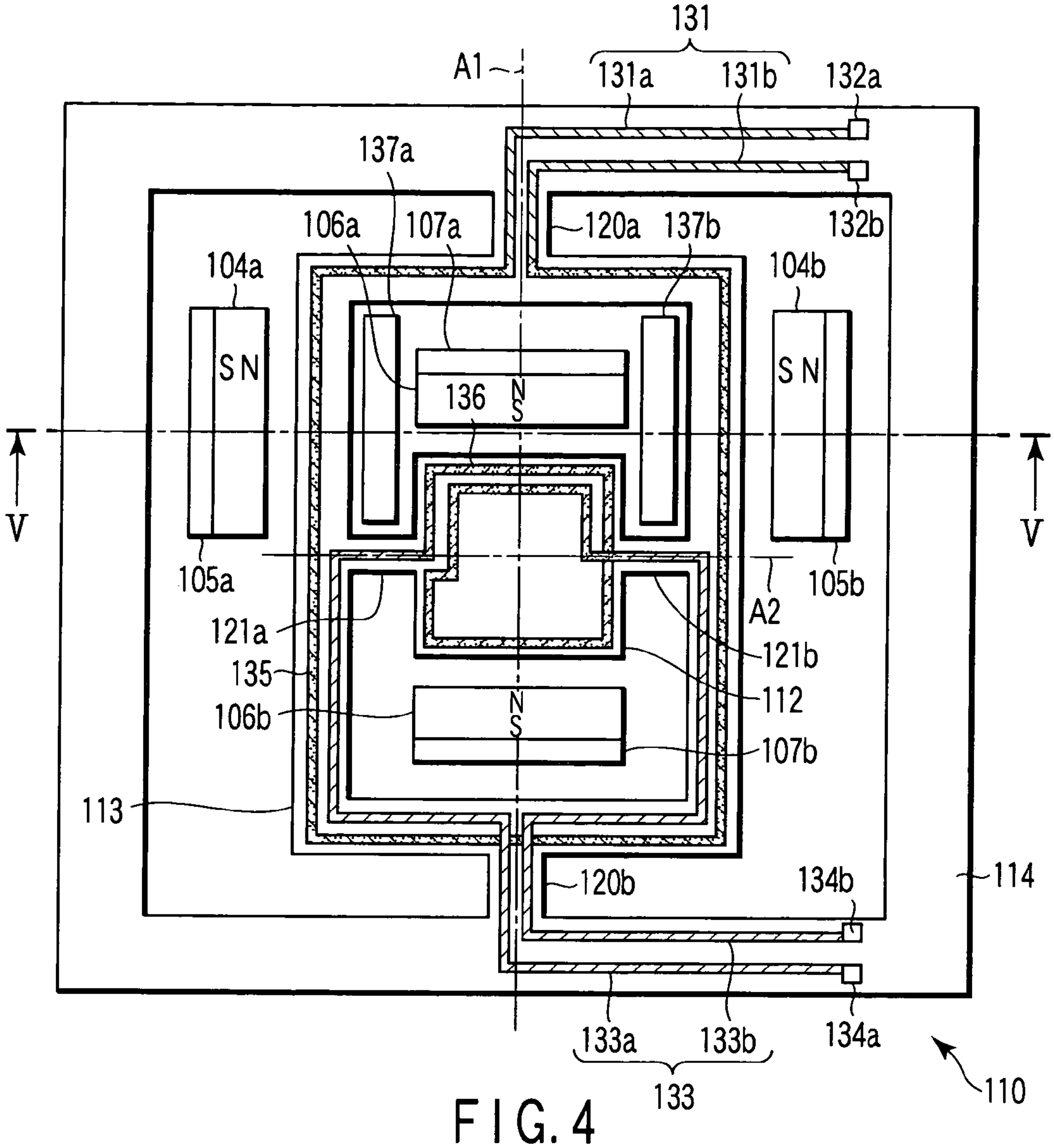
FIG. 4 is a sectional view of an optical deflector according to a modification to the first embodiment of the present invention, showing a cross-section similar to that of FIG. 2.
Figure 5:
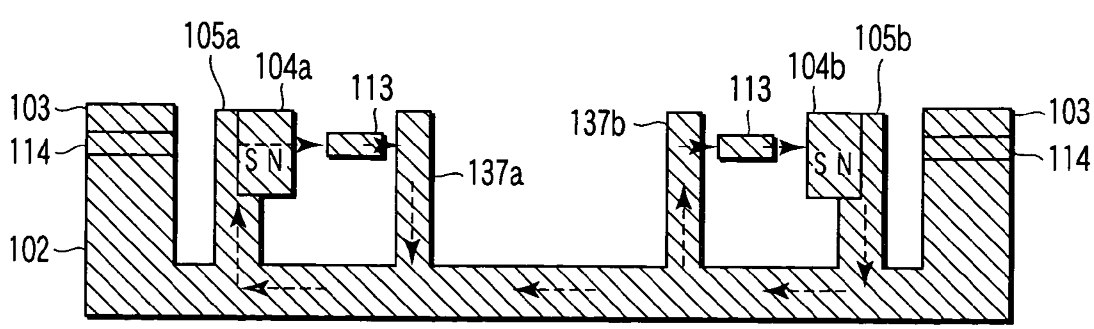
FIG. 5 is a sectional view taken along a line V—V of the optical deflector in FIG. 4.

FIG. 4 is a sectional view of an optical deflector according to a modification to the first embodiment of the present invention, and shows a cross-section similar to that of FIG. 2. FIG. 4 schematically shows driving coils and wirings to show their layout, although the driving coils and wirings are not actually seen because they are provided on the lower surface. FIG. 5 is a sectional view taken along a line V—V of the optical deflector in FIG. 4. The same reference numerals as in FIGS. 2 and 3 denote the same members in FIGS. 4 and 5.

In the optical deflector of this modification, as shown in FIGS. 4 and 5, the lower base 102 further includes two members (front yokes) 137*a* and 137*b*, which are located inside the outer movable plate 113 so as to face the permanent magnets 104*a* and 104*b* for driving the outer movable plate through the outer movable plate 113.

In this modification, as magnetic flux lines are indicated by the dotted arrows in FIG. 5, the front yokes 137*a* and 137*b* constitute a perfect magnetic circuit, together with the permanent magnets 104*a* and 104*b*. For this reason, the magnetic flux hardly leaks inward from the front yokes 137*a* and 137*b* (on the inner movable plate 112 side). This therefore further reduces the influence of drive crosstalk, and hence improves the driving precision of the outer movable plate 113.

Second Embodiment

Figure 6:
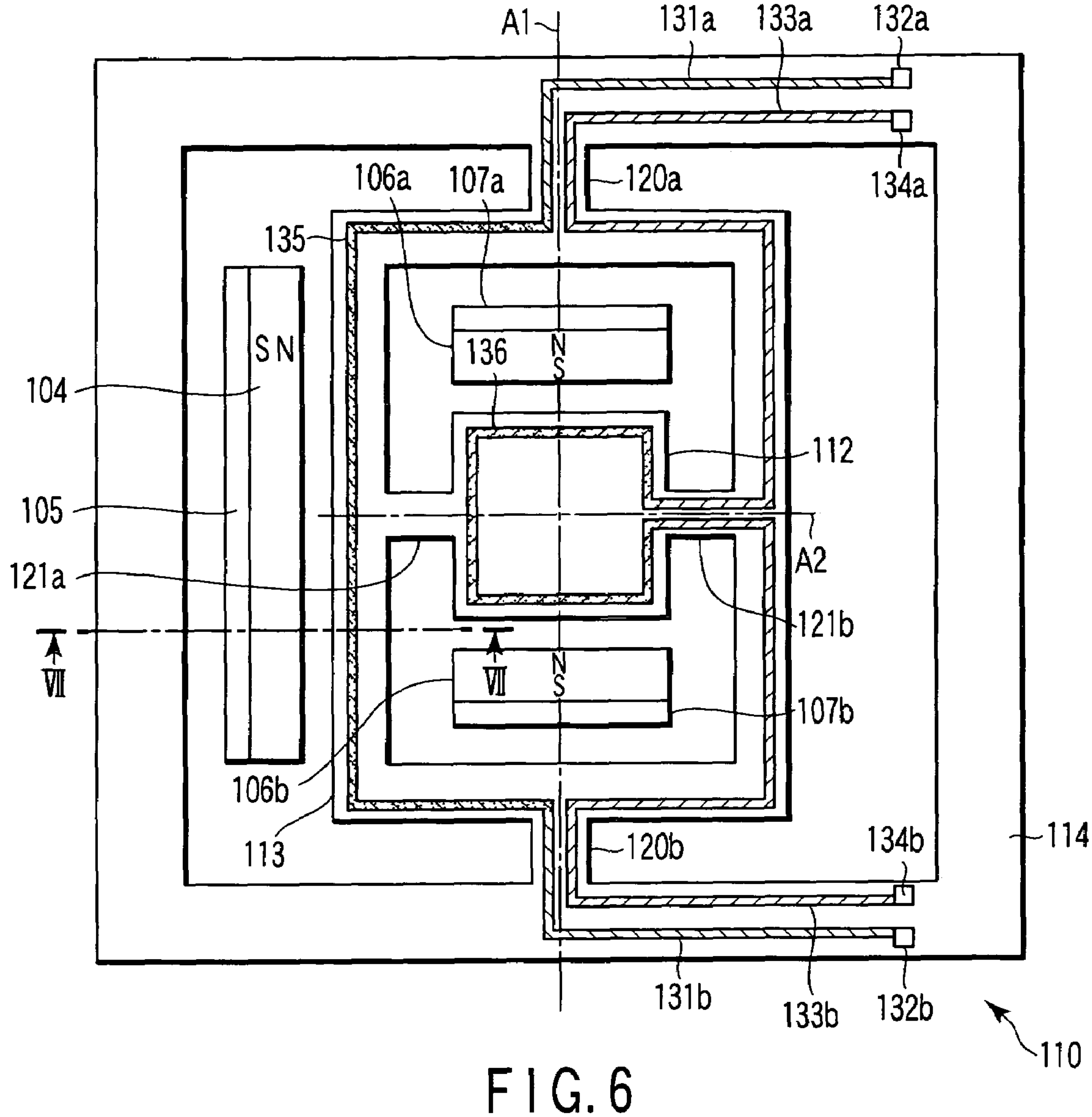
FIG. 6 is a sectional view of an optical deflector according to the second embodiment of the present invention, showing a cross-section similar to that of FIG. 2.
Figure 7:
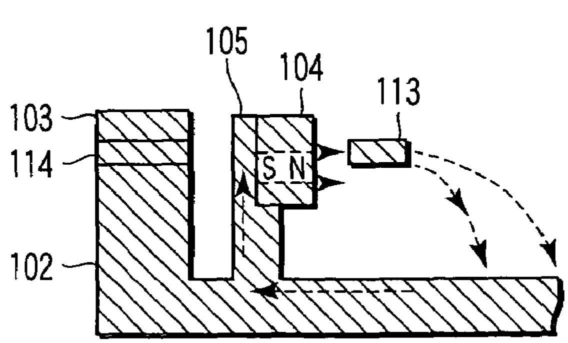
FIG. 7 is a sectional view taken along a line VII—VII of the optical deflector in FIG. 6.

FIG. 6 is a sectional view of an optical deflector according to the second embodiment of the present invention, and shows a cross-section similar to that of FIG. 2. FIG. 6 schematically shows driving coils and wirings to show their layout, although the driving coils and wirings are not actually seen because they are provided on the lower surface. FIG. 7 is a sectional view taken along a line VII—VII of the optical deflector in FIG. 6. The same reference numerals as in FIGS. 2 and 3 denote the same members in FIGS. 6 and 7.

This embodiment differs from the first embodiment in the layout of driving coils and wirings and the arrangement of an outer movable plate driving magnetic field generator. The differences between this embodiment and the first embodiment will be described below.

An outer driving coil wiring 131 for supplying a current to an outer driving coil 135 of an outer movable plate 113 is connected to electrode pads 132*a* and 132*b* on a frame 114 via two outer torsion bars 120*a* and 120*b* and the frame 114. The outer driving coil wiring 131 is further connected to drive power supplies (not shown) through lead wires 130 like those shown in FIG. 1, which are joined to the electrode pads 132*a* and 132*b* by soldering or the like.

More specifically, the outer driving coil 135 starts to extend from the connecting portion between one of the outer torsion bars 120*a* and 120*b* and the outer movable plate 113, makes a half turn on the outer movable plate 113, and is placed on the connecting portion between the other of the outer torsion bars 120*a* and 120*b* and the outer movable plate 113. The outer driving coil wiring 131 runs through the outer torsion bars 120*a* and 120*b*, and runs on the frame 114, and is connected to the electrode pads 132*a* and 132*b*. Note that the outer driving coil 135 makes at least a half turn on the outer movable plate 113. (The number of turns of the outer driving coil 135 (the number of turns of the coil) is not limited to this. The outer driving coil 135 may make one turn or an integral number of turns, and the outer driving coil wiring 131 may run through the same outer torsion bar. In addition, the outer driving coil 135 may make 1.5 or more turns (integer +0.5) turns.)

More specifically, the outer driving coil 135 extends from the coupling portion between the outer movable plate 113 and the first outer torsion bar 120*a*, makes an almost half turn on the outer movable plate 113, and extends to the coupling portion between the outer movable plate 113 and the second outer torsion bar 120*b*. It suffices if the outer driving coil 135 makes at least a half turn (½ turn) on the outer movable plate 113. That is, although the outer driving coil 135 makes a half turn on the outer movable plate 113 in FIG. 6, the coil may further make an integral number of turns. That is, the outer driving coil 135 may make n (n is a natural number) and half turns on the outer movable plate 113.

The outer driving coil wiring 131 includes two wiring portions 131*a* and 131*b* extending from the two ends of the outer driving coil 135. The wiring portions 131*a* and 131*b* extend to the frame 114 through the first and second outer torsion bars 120*a* and 120*b*, respectively. The outer driving coil 135 is therefore located on the left side portion (first portion), of the two portions (first and second portions) of the outer movable plate 113 divided into two portions with reference to a first axis A1, which is located on the first inner torsion bar 121*a* side. The end portions of the wiring portions 131*a* and 131*b* are electrically connected to the electrode pads 132*a* and 132*b* on the frame 114.

Although not shown in FIG. 6, reference numeral 131 of the outer driving coil wiring serves as a generic term for the wiring portions 131*a* and 131*b* constituting the outer driving coil wiring. Assume that the outer driving coil wiring is denoted by reference numeral 131 even if it is not illustrated in particular. Similarly, as in the case of an inner driving coil wiring to be described later, the wiring is denoted by reference numeral 133 even if it is not illustrated in particular.

The inner driving coil wiring 133 for supplying a current to an inner driving coil 136 of an inner movable plate 112 is connected to electrode pads 134*a* and 134*b* on the frame 114 via the inner torsion bar 121*b*, the outer movable plate 113, the two outer torsion bars 120*a* and 120*b*, and the frame 114. The inner driving coil wiring 133 is further connected to drive power supplies (not shown) through the lead wires 130 like those shown in FIG. 1, which are joined to the electrode pads 134*a* and 134*b*, respectively, by soldering or the like.

More specifically, the inner driving coil wiring 133 extends from the electrode pad 134*a* located at a position on the frame 114 that is on the same side as the electrode pad 132*a* with respect to the inner movable plate 112 and outer movable plate 113, and runs on the frame 114. The inner driving coil wiring 133 further runs through the outer torsion bar 120*a*, together with the outer driving coil wiring 131, and runs on a portion on the outer movable plate 113 on which the outer driving coil 135 does not run. The inner driving coil wiring 133 runs through the inner torsion bar 121*b* and is connected to one end of the inner driving coil 136 on the inner movable plate 112. The inner driving coil 136 runs around on the inner movable plate 112 (makes one turn in FIG. 6). The inner driving coil wiring 133 connected to the other end of the inner driving coil 136 runs through the inner torsion bar 121*b* through which the inner driving coil wiring 133 connected to the electrode pad 134*a* runs. The inner driving coil wiring 133 then runs on a portion on the outer movable plate 113 through which the outer driving coil 135 does not run, and runs through the outer torsion bar 120*b*. The inner driving coil wiring 133 further runs on the frame 114 and is connected to the electrode pad 134*b* placed at a position where it faces the electrode pad 134*a* with respect to the inner or outer movable plate.

More specifically, the inner driving coil 136 extends from the coupling portion between the inner movable plate 112 and the second inner torsion bar 121*b*, runs around on the inner movable plate 112, and extends to the coupling portion between the inner movable plate 112 and the second inner torsion bar 121*b*. It suffices if the inner driving coil 136 makes at least one turn on the inner movable plate 112. That is, although the inner driving coil 136 makes one turn on the inner movable plate 112, it may make two or more turns.

The inner driving coil wiring 133 includes a first wiring portion 133*a* extending from one end portion of the inner driving coil 136 and a second wiring portion 133*b* extending from the other end portion of the inner driving coil 136. The first wiring portion 133*a* runs through the second inner torsion bar 121*b*, makes an almost quarter turn (¼ turn) on the outer movable plate 113, and extends to the frame 114 through the first outer torsion bar 120*a*. The second wiring portion 133*b* runs through the second inner torsion bar 121*b*, makes an almost quarter turn on the outer movable plate 113, and extends to the frame 114 through the second outer torsion bar 120*b*. The inner driving coil wiring 133 is therefore positioned on the right side portion (second portion), of the two portions (first and second portions) of the outer movable plate 113 divided into two portions with reference to the first axis A1, which is located on the second inner torsion bar 121*b* side. The end portions of the first and second wiring portions 133*a* and 133*b* are electrically connected to the electrode pads 134*a* and 134*b* on the is frame 114, respectively.

In this embodiment, a lower base 102 is provided with one permanent magnet 104. The lower base 102 includes one member (back yoke) 105, which holds the permanent magnet 104. The back yoke 105 is located behind the permanent magnet 104 with respect to the outer movable plate 113, and causes the magnetic flux of the permanent magnet 104 to flow. The permanent magnet 104 is joined to the back yoke 105 such that the magnetization direction is perpendicular to the joint surface between the back yoke 105 and the permanent magnet 104. The permanent magnet 104 and back yoke 105 constitute outer movable plate driving magnetic field generating means or an outer movable plate driving magnetic field generator for generating a magnetic field that is substantially parallel to the second axis A2 and crosses the outer movable plate 113.

The permanent magnet 104 for driving the outer movable plate is joined to the back yoke 105 so as to be placed between the frame 114 and the outer movable plate 113. The permanent magnet 104 is placed, with respect to that portion (the left side in FIG. 6) of the outer movable plate 113 on which only the outer driving coil 135 is placed, such that a line perpendicular to the magnetization direction (for example, the direction in which, as shown in FIGS. 6 and 7, the back yoke side and the outer movable plate 113 side of the permanent magnet 104 become the S pole and N pole, respectively) is generally parallel to an axis connecting the outer torsion bars 120*a* and 120*b*.

That is, the permanent magnet 104 and back yoke 105 are located outside, along the second axis A2, the left side portion (first portion), of the two portions (first and second portions) of the outer movable plate 113 divided into two portions with reference to the first axis A1, which is located on the first inner torsion bar 121*a* side. The permanent magnet 104 and back yoke 105 extend generally parallel to that portion of the outer driving coil 135 which extends generally parallel to the first axis A1.

The inner movable plate driving magnetic field generator of this embodiment has the same arrangement as that of the first embodiment. That is, the inner movable plate driving magnetic field generator comprises permanent magnets 106*a* and 106*b* and back yokes 107*a* and 107*b*, which are arranged in the same manner as in the first embodiment.

That is, the two permanent magnets 106*a* and 106*b* for driving the inner movable plate are joined to the back yokes 107*a* and 107*b* so as to be arranged between the outer movable plate 113 and the inner movable plate 112 as in the first embodiment. In addition, the permanent magnets 106*a* and 106*b* are arranged such that a line perpendicular to the magnetization direction (for example, the direction in which, as shown in FIG. 6, the back yoke side and inner movable plate 112 side of the permanent magnet 106*a* on the upper side in FIG. 6 become the N pole and S pole, respectively, and the back yoke side and inner movable plate 112 side of the permanent magnet 106*b* on the lower side become the S pole and N pole, respectively) becomes generally parallel to an axis connecting the inner torsion bars 121*a* and 121*b*.

The operation of the optical deflector of this embodiment will be described next.

As in the first embodiment, when AC currents (or DC currents) are supplied to the outer driving coil wiring 131 and outer driving coil 135, Lorentz force is generated by the interaction between the current flowing in the outer driving coil 135 and the magnetic field of the permanent magnet 104 (the directions of magnetic flux lines are indicated by the dotted arrows in FIG. 7). Owing to the Lorentz force, the outer movable plate 113 oscillates (tilts) on the outer torsion bars 120*a* and 120*b* as axes, i.e., about the first axis A1. In addition, when AC currents (or DC currents) are supplied to the inner driving coil wiring 133 and inner driving coil 136, Lorentz force is generated by the interaction between the current flowing in the inner driving coil 136 and the magnetic fields of the permanent magnets 106*a* and 106*b*. Owing to the Lorentz force, the inner movable plate 112 oscillates (or tilts) on the inner torsion bars 121*a* and 121*b* as axes, i.e., about the second axis A2.

In the optical deflector of this embodiment as well, in brief, the inner driving coil wiring 133 extends on the outer movable plate 113 so as to avoid the magnetic fields generated by the permanent magnet 104. In other words, the inner driving coil wiring 133 is placed on that portion of the outer movable plate 113 which is generally parallel to an axis (first axis A1) connecting the outer torsion bars 120*a* and 120*b* and does not directly face the permanent magnet 104 for driving the outer movable plate (i.e., that portion of the outer movable plate 113 which is farther from the permanent magnet 104). For this reason, the magnetic field generated by the permanent magnet 104 does not act on the inner driving coil wiring 133. The outer movable plate 113 is therefore driven without being affected by the current flowing in the inner driving coil wiring 133. That is, the outer movable plate 113 and inner movable plate 112 can be driven independently of each other.

Although the inner driving coil wiring 133 connected to the inner driving coil 136 for driving the inner movable plate 112 runs on the outer movable plate 113, the wiring runs through the portion that is not easily affected by the magnetic field of the permanent magnet 104 (the side of the outer movable plate that is farther from the permanent magnet 104). Therefore, the Lorentz force acting on the outer movable plate 113 is generated by only the interaction between the current flowing in the outer driving coil 135 and the magnetic field of the permanent magnet 104. More specifically, in this embodiment, since only one permanent magnet 104 is used to drive the outer movable plate 113, and there is no other magnet that faces the permanent magnet 104, the magnetic flux lines of the permanent magnet 104 forming a magnetic circuit flow almost in the manner indicated by the dotted arrows in FIG. 7.

The magnetic field is high near the permanent magnet 104 and rapidly decreases with an increase in distance from the permanent magnet 104. Therefore, although the inner driving coil wiring 133 runs on the outer movable plate 113, the Lorentz force acting on the outer movable plate 113 has very little influence on the oscillation of the outer movable plate 113 in the portion through which the inner driving coil wiring 133 runs. This makes it possible to accurately drive the outer movable plate 113 in the two-dimensional driving operation of driving both the inner movable plate 112 and the outer movable plate 113. In other words, these plates can be two-dimensionally driven independently of each other without much influence of drive crosstalk. In addition, since the permanent magnet 104 for driving the outer movable plate is placed on only one side of the outer movable plate 113, and there is no factor, around the outer movable plate 113, which limits the deflection direction of a light beam (the direction in which a light beam is deflected upon rotation of the outer movable plate 113 about the oscillation axis), the deflection angle of a light beam can be increased as compared with the first embodiment.

Modification

FIG. 8 is a sectional view of an optical deflector according to a modification to the second embodiment of the present invention, and shows a cross-section similar to that of FIG. 2. FIG. 8 schematically shows driving coils and wirings to show their layout, although the driving coils and wirings are not actually seen because they are provided on the lower surface. FIG. 9 is a sectional view taken along a line IX—IX of the optical deflector in FIG. 8. The same reference numerals as in FIGS. 2 and 3 denote the same members in FIGS. 8 and 9.

In the optical deflector of this modification, as shown in FIGS. 8 and 9, the lower base 102 further include two members (front yokes) 137, which are located inside the outer movable plate 113 so as to face the permanent magnet 104 for driving the outer movable plate through the outer movable plate 113. The two front yokes 137 are positioned along the first axis A1 with the first inner torsion bar 121*a* being located between them.

In this modification, the front yokes 137 constitute a perfect magnetic circuit, together with the permanent magnet 104, as the dotted arrows indicate a magnetic flux line in FIG. 9. For this reason, the magnetic flux hardly leaks inward from the front yokes 137 (on the inner movable plate 112 side). This therefore further reduces the influence of drive crosstalk, and hence improves the driving precision of the outer movable plate 113.

In this embodiment and the modification, since the first inner torsion bar 121*a* has no inner driving coil wiring, the first inner torsion bar 121*a* may be omitted.

Third Embodiment

Figure 10:
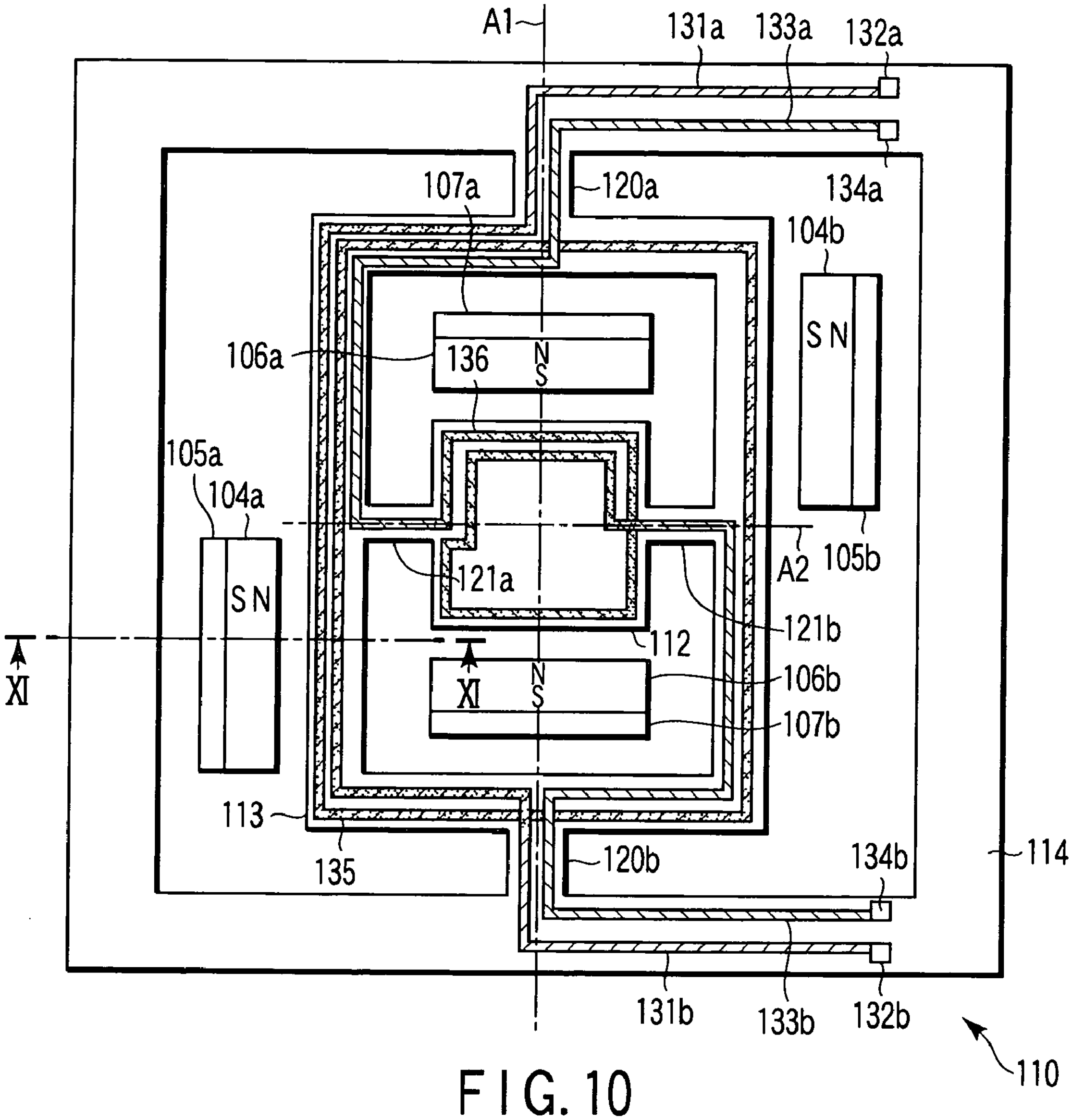
FIG. 10 is a sectional view of an optical deflector according to the third embodiment of the present invention, showing a cross-section similar to that of FIG. 2.
Figure 11:
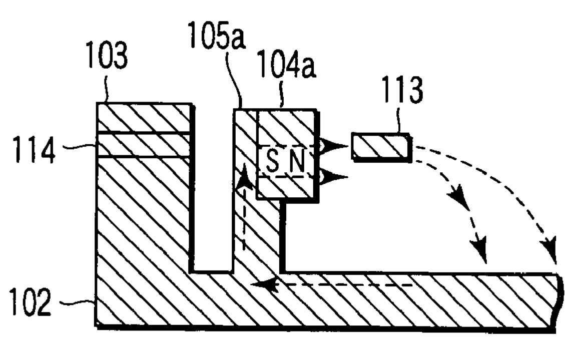
FIG. 11 is a sectional view taken along a line XI—XI of the optical deflector in FIG. 10.

FIG. 10 is a sectional view of an optical deflector according to the third embodiment of the present invention, and shows a cross-section similar to that of FIG. 2. FIG. 10 schematically shows driving coils and wirings to show their layout, although the driving coils and wirings are not actually seen because they are provided on the lower surface. FIG. 11 is a sectional view taken along a line XI—XI of the optical deflector in FIG. 10. The same reference numerals as in FIGS. 2 and 3 denote the same members in FIGS. 10 and 11.

This embodiment differs from the first embodiment in the layout of driving coils and wirings and the arrangement of an outer movable plate driving magnetic field generator. The differences between this embodiment and the first embodiment will be described below.

An outer driving coil wiring 131 for supplying a current to an outer driving coil 135 of an outer movable plate 113 is connected to electrode pads 132*a* and 132*b* on a frame 114 via two outer torsion bars 120*a* and 120*b* and the frame 114. The outer driving coil wiring 131 is further connected to drive power supplies (not shown) through lead wires 130 like those shown in FIG. 1, which are joined to the electrode pads 132*a* and 132*b* by soldering or the like.

More specifically, the outer driving coil 135 starts to extend from the connecting portion between one of the outer torsion bars 120*a* and 120*b* and the outer movable plate 113, makes one and half turns on the outer movable plate 113, and extends to the connecting portion between the other of the outer torsion bars 120*a* and 120*b* and the outer movable plate 113. The outer driving coil wiring 131 runs through the outer torsion bars 120*a* and 120*b* and the frame 114 and is connected to the electrode pads 132*a* and 132*b*. Note that the outer driving coil 135 makes at least one and half turns on the outer movable plate 113.

More specifically, the outer driving coil 135 extends from the coupling portion between the outer movable plate 113 and the first outer torsion bar 120*a*, makes at least one and half turns on the outer movable plate 113, and extends to the coupling portion between the outer movable plate 113 and the second outer torsion bar 120*b*. It suffices if the outer driving coil 135 makes at least one and half turns (3/2 turns) on the outer movable plate 113. That is, although the outer driving coil 135 makes one and half turns on the outer movable plate 113 in FIG. 10, it may further make an integral number of turns. In other words, the outer driving coil 135 may make n (n is a natural number) and half turns on the outer movable plate 113.

The outer driving coil wiring 131 includes two wiring portions 131*a* and 131*b* extending from the two ends of the outer driving coil 135. The wiring portions 131*a* and 131*b* run through the first and second outer torsion bars 120*a* and 120*b*, respectively, and extend to the frame 114. The end portions of the wiring portions 131*a* and 131*b* are electrically connected to the electrode pads 132*a* and 132*b* on the frame 114.

As in the first embodiment, an inner driving coil 136 extends from the coupling portion between an inner movable plate 112 and a first inner torsion bar 121*a*, turns around on the inner movable plate 112, and extends to the coupling portion between the inner movable plate 112 and a second inner torsion bar 121*b*.

An inner driving coil wiring 133 for supplying a current to the inner driving coil 136 of the inner movable plate 112 is connected to electrode pads 134*a* and 134*b* on the frame 114 via the two inner torsion bars 121*a* and 121*b*, the outer movable plate 113, the two outer torsion bars 120*a* and 120*b*, and the frame 114. The inner driving coil wiring 133 is connected to drive power supplies (not shown) through the lead wires 130 like those shown in FIG. 1, which are joined to the electrode pads 134*a* and 134*b* by soldering or the like.

More specifically, the inner driving coil wiring 133 extends from the electrode pad 134*a* placed on the same side on the frame 114 as the electrode pad 132*a* with respect to the inner movable plate 112 and outer movable plate 113, runs on the frame 114, runs through the outer torsion bar 120*a* together with the outer driving coil wiring 131*a*, runs on the outer movable plate 113 together with the outer driving coil 135, runs on the inner torsion bar 121*a*, and is connected to one end of the inner driving coil 136 on the inner movable plate 112. The inner driving coil 136 runs around (makes one and half turns in FIG. 10) on the inner movable plate 112. The inner driving coil wiring 133 connected to the other end of the inner driving coil 136 runs through the inner torsion bar 121*b*, runs on the outer movable plate 113, runs through the outer torsion bar 120*b*, and is connected to the electrode pad 134*b* located on the frame 114 at a position where it faces the electrode pad 134*a* with respect to the inner movable plate 112 and outer movable plate 113. The path of the inner driving coil wiring 133 is point-symmetrical with respect to the center of the inner movable plate 112 on the outer movable plate 113.

More specifically, the inner driving coil wiring 133 includes a first wiring portion 133*a* extending from one end portion of the inner driving coil 136 and a second wiring portion 133*b* extending from the other end portion of the inner driving coil 136. The first wiring portion 133*a* runs through the first inner torsion bar 121*a*, makes an almost quarter turn (¼ turn) on the outer movable plate 113, and extends to the frame 114 through the first outer torsion bar 120*a*. The second wiring portion 133*b* runs through the second inner torsion bar 121*b*, makes an almost quarter turn on the outer movable plate 113, and extends to the frame 114 through the second outer torsion bar 120*b*. Therefore, the inner driving coil wiring 133 is positioned on portions, of the four portions (first, second, third, and fourth portions) of the outer movable plate 113 divided into four portions with reference to first and second axes A1 and A2, which are diagonally adjacent to each other. That is, the inner driving coil wiring 133 is located on the upper left portion (first portion) between the first inner torsion bar 121*a* and the first outer torsion bar 120*a* and the lower right portion (fourth portion) between the second inner torsion bar 121*b* and the second outer torsion bar 120*b*. The end portions of the first and second wiring portions 133*a* and 133*b* are electrically connected to the electrode pads 134*a* and 134*b* on the frame 114, respectively.

As in the first embodiment, a lower base 102 is provided with two permanent magnets 104*a* and 104*b*. The lower base 102 includes two members (back yokes) 105*a* and 105*b*, which hold the permanent magnets 104*a* and 104*b*, respectively. The permanent magnets 104*a* and 104*b* for driving the outer movable plate are joined to the back yokes 105*a* and 105*b*, respectively, so as to be arranged between the frame 114 and the outer movable plate 113. The permanent magnets 104*a* and 104*b* and the back yokes 105*a* and 105*b* constitute outer movable plate driving magnetic field generating means or an outer movable plate driving magnetic field generator for generating a magnetic field that is substantially parallel to the second axis A2 and crosses the outer movable plate 113.

In this embodiment, the permanent magnets 104*a* and 104*b* are arranged, with respect to those portions of the outer movable plate 113 on which only the outer driving coil 135 is placed (the upper right portion and lower left portion of the outer movable plate 113 in FIG. 10), such that a line perpendicular to the magnetization direction (for example, the direction in which, as shown in FIGS. 10 and 11, the back yoke side and outer movable plate 113 side of the permanent magnet 104*a* on the left side in FIGS. 10 and 11 become the S pole and N pole, respectively, and the back yoke side and outer movable plate 113 side of the permanent magnet 104*b* on the right side become the N pole and S pole, respectively) becomes generally parallel to an axis connecting the outer torsion bars 120*a* and 120*b*.

That is, the permanent magnets 104*a* and 104*b* and the back yokes 105*a* and 105*b* are respectively positioned outside, along the second axis A2, the lower left portion (second portion), of the four portions (first, second, third, and fourth portions) of the outer movable plate 113 divided into four portions with reference to the first and second axes A1 and A2, which is located between the first inner torsion bar 121*a* and the second outer torsion bar 120*b*, and the upper right portion (third portion), which is located between the first inner torsion bar 121*b* and the first outer torsion bar 120*a*. The surfaces of the permanent magnets 104*a* and 104*b* and back yokes 105*a* and 105*b* facing the outer movable plate 113 extend generally parallel to those portions of the outer driving coil 135 which are generally parallel to the first axis A1.

In this embodiment, the inner movable plate driving magnetic field generator has the same arrangement as that of the first embodiment. That is, the inner movable plate driving magnetic field generator comprises permanent magnets 106*a* and 106*b* and back yokes 107*a* and 107*b*, which are arranged in the same manner as in the first embodiment.

That is, the two permanent magnets 106*a* and 106*b* for driving the inner movable plate are joined to the back yokes 107*a* and 107*b* so as to be arranged between the outer movable plate 113 and the inner movable plate 112 as in the first embodiment. In addition, the permanent magnets 106*a* and 106*b* are arranged such that a line perpendicular to the magnetization direction (for example, the direction in which, as shown in FIG. 10, the back yoke side and inner movable plate 112 side of the permanent magnet 106*a* on the upper side in FIG. 10 become the N pole and S pole, respectively, and the back yoke side and inner movable plate 112 side of the permanent magnet 106*b* on the lower side become the S pole and N pole, respectively) becomes generally parallel to an axis connecting the inner torsion bars 121*a* and 121*b*.

The operation of the optical deflector according to this embodiment will be described next.

As in the first embodiment, when AC currents (or DC currents) are supplied to the outer driving coil wiring 131 and outer driving coil 135, Lorentz force is generated by the interaction between the current flowing in the outer driving coil 135 and the magnetic fields of the permanent magnets 104*a* and 104*b* (the directions of magnetic flux lines are indicated by the dotted arrows in FIG. 11). Owing to the Lorentz force, the outer movable plate 113 oscillates (or tilts) on the outer torsion bars 120*a* and 120*b* as axes, i.e., about the first axis A1. When AC currents (or DC currents) are supplied to the inner driving coil wiring 133 and inner driving coil 136, Lorentz force is generated by the interaction between the current flowing in the inner driving coil 136 and the magnetic fields of the permanent magnets 106*a* and 106*b*. Owing to the Lorentz force, the inner movable plate 112 oscillates (or tilts) on the inner torsion bars 121*a* and 121*b* as axes, i.e., about the second axis A2.

In the optical deflector of this embodiment as well, in brief, the inner driving coil wiring 133 extends on the outer movable plate 113 so as to avoid the magnetic fields generated by the permanent magnets 104*a* and 140*b* for driving the outer movable plate. In other words, the inner driving coil wiring 133 is placed on those portions of the outer movable plate 113 which are generally parallel to an axis (first axis A1) connecting the outer torsion bars 120*a* and 120*b* and do not directly face the permanent magnets 104*a* and 140*b* for driving the outer movable plate (i.e., those portion of the outer movable plate 113 which are farther from the permanent magnets 104*a* and 104*b*). For this reason, the magnetic fields generated by the permanent magnets 104*a* and 104*b* do not act on the inner driving coil wiring 133. The outer movable plate 113 is therefore driven without being affected by the current flowing in the inner driving coil wiring 133. That is, the outer movable plate 113 and inner movable plate 112 can be driven independently of each other.

Although the inner driving coil wiring 133 connected to the inner driving coil 136 for driving the inner movable plate 112 runs on the outer movable plate 113, the wiring runs on the portions that are not easily affected by the magnetic fields of the permanent magnets 104*a* and 104*b* (the sides on the outer movable plate 113 that are farther from the two permanent magnets 104*a* and 104*b* that are placed to face the outer movable plate 113). Therefore, the Lorentz force acting on the outer movable plate 113 is generated by only the interaction between the current flowing in the outer driving coil 135 and the magnetic fields of the permanent magnets 104*a* and 104*b*. More specifically, in this embodiment, since the two permanent magnets 104*a* and 104*b* for driving the outer movable plate 113 are located near the inner driving coil wiring 133 running on the outer movable plate 113 so as not to face each other, the magnetic flux lines of the permanent magnets 104*a* and 104*b* forming a magnetic circuit flow almost in the manner indicated by the dotted arrows in FIG. 11.

The magnetic field is high near the permanent magnets 104*a* and 104*b* and rapidly decreases with an increase in distance from the permanent magnets 104*a* and 104*b*. Therefore, although the inner driving coil wiring 133 runs on the outer movable plate 113, the Lorentz force acting on the outer movable plate 113 has very little influence on the oscillation of the outer movable plate 113 in the portions through which the inner driving coil wiring 133 runs. This makes it possible to accurately drive the outer movable plate 113 in the two dimensional driving operation of driving both the inner movable plate 112 and the outer movable plate 113 as in the first embodiment. In other words, these plates can be two-dimensionally driven independently of each other without much influence of drive crosstalk. In addition, with respect to the outer torsion bars 120*a* and 120*b* as oscillation axes, the two permanent magnets 104*a* and 104*b* are arranged point-symmetrically with respect to the central position of the inner movable plate 112 on the oscillation axis. For this reason, the locus of the oscillation of the outer movable plate 113 is almost symmetrical with respect to the center of the movable plate, and unnecessary resonance or the like does not easily occur.

Modification

Figure 12:
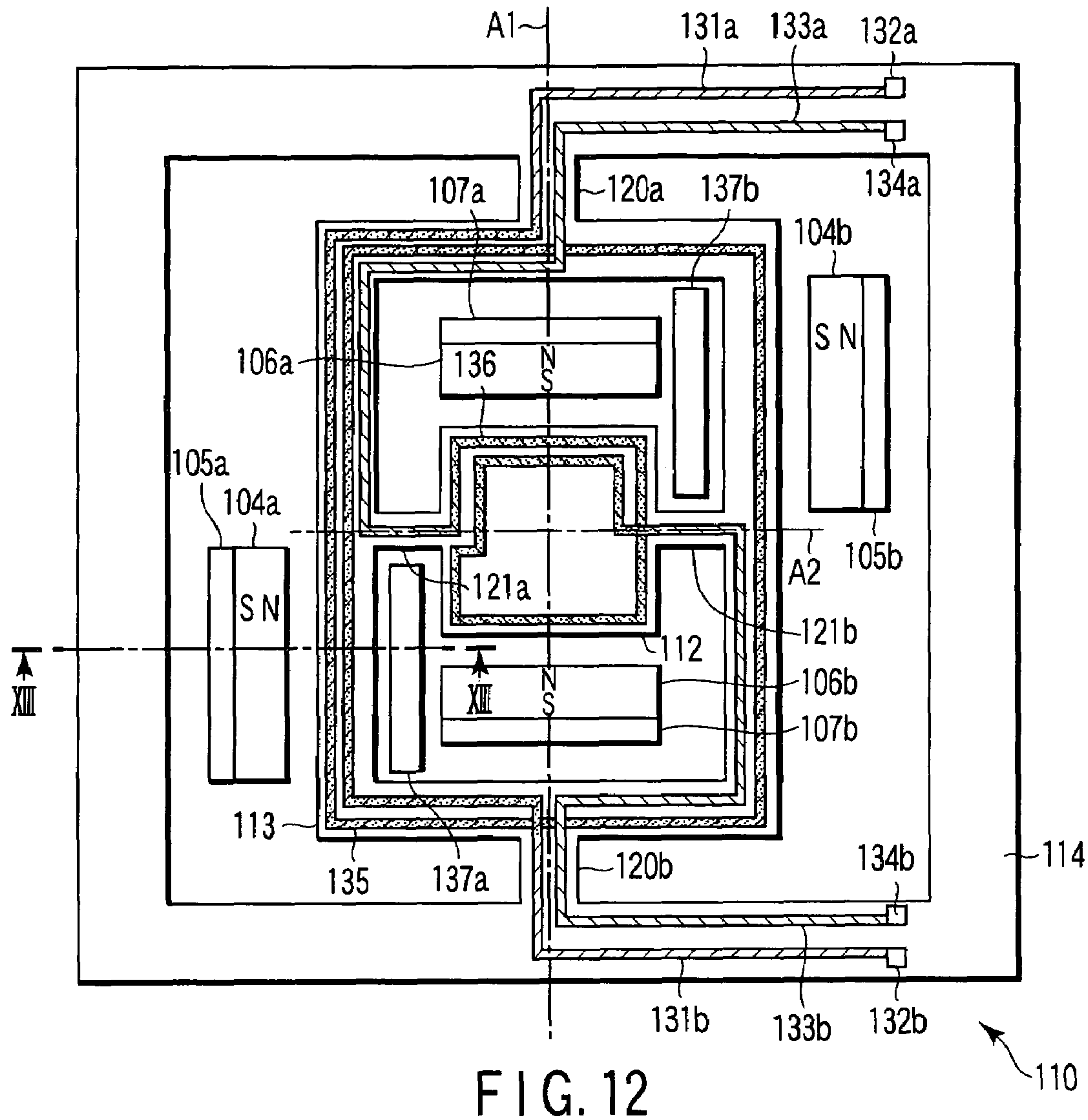
FIG. 12 is a sectional view of an optical deflector according to a modification to the third embodiment of the present invention, showing a cross-section similar to that of FIG. 2.
Figure 13:
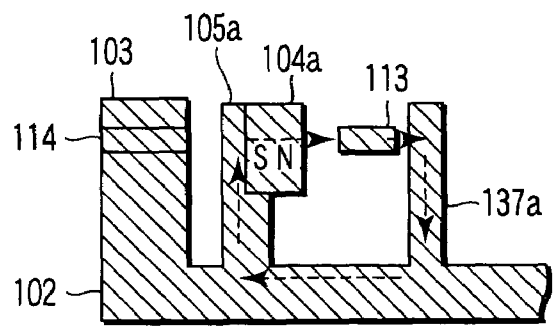
FIG. 13 is a sectional view taken along a line XIII—XIII of the optical deflector in FIG. 12.

FIG. 12 is a sectional view of an optical deflector according to a modification to the third embodiment of the present invention, and shows a cross-section similar to that of FIG. 2. FIG. 12 schematically shows driving coils and wirings to show their layout, although the driving coils and wirings are not actually seen because they are provided on the lower surface. FIG. 13 is a sectional view taken along a line XIII—XIII of the optical deflector in FIG. 12. The same reference numerals as in FIGS. 2 and 3 denote the same members in FIGS. 12 and 13.

In the optical deflector of this modification, as shown in FIGS. 12 and 13, the lower base 102 includes two members (front yokes) 137*a* and 137*b*, which are located inside the outer movable plate 113 so as to face the permanent magnets 104*a* and 104*b* for driving the outer movable plate through the outer movable plate 113.

In this modification, the front yokes 137*a* and 137*b* constitute a perfect magnetic circuit, together with the permanent magnets 104*a* and 104*b*, as the dotted arrows indicate a magnetic flux line in FIG. 13. For this reason, the magnetic flux hardly leaks inward from the front yokes 137*a* and 137*b* (on the inner movable plate 112 side). This therefore further reduces the influence of drive crosstalk, and hence improves the driving precision of the outer movable plate 113.

Fourth Embodiment

Figure 14:
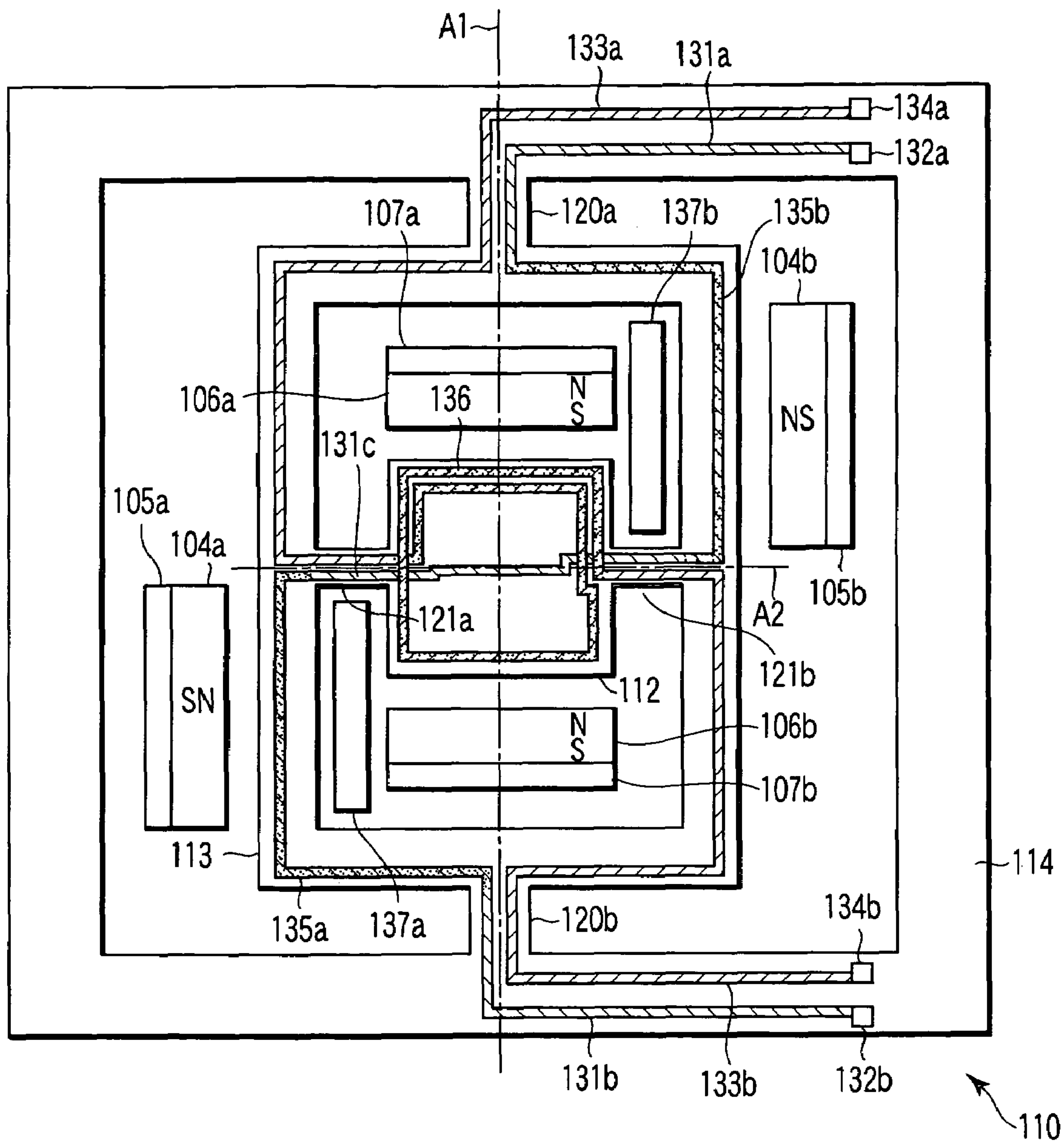
FIG. 14 is a sectional view of an optical deflector according to the fourth embodiment of the present invention, showing a cross-section similar to that of FIG. 2.
Figure 15:
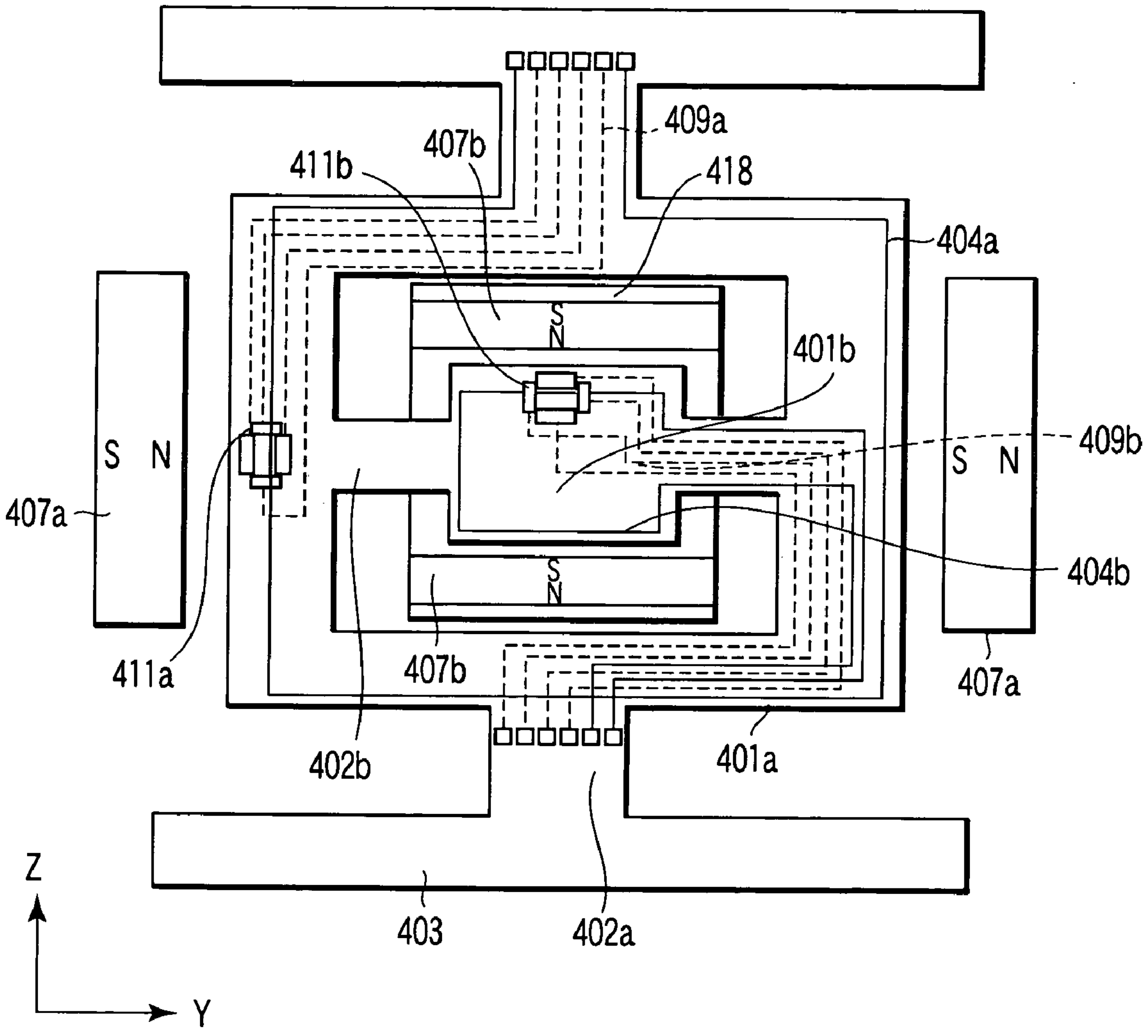
FIG. 15 is a sectional view showing a two-dimensional optical deflector disclosed in U.S. Pat. No. 6,108,118.

FIG. 14 is a sectional view of an optical deflector according to the fourth embodiment of the present invention, and shows a cross-section similar to that of FIG. 2. FIG. 14 schematically shows driving coils and wirings to show their layout, although the driving coils and wirings are not actually seen because they are provided on the lower surface. The same reference numerals as in FIG. 2 denote the same members in FIG. 14.

This embodiment differs from the first embodiment in the layout of driving coils and wirings and the arrangement of an outer movable plate driving magnetic field generator. The differences between this embodiment and the first embodiment will be described below.

In this embodiment, as shown in FIG. 14, an outer driving coil 135 includes a first coil portion 135*a* that extends from the coupling portion between an outer movable plate 113 and a first inner torsion bar 121*a*, makes an almost quarter turn (¼ turn) on the outer movable plate 113, and extends to the coupling portion between the outer movable plate 113 and a second outer torsion bar 120*b* and a second coil portion 135*b* that extends from the coupling portion between the outer movable plate 113 and a second inner torsion bar 121*b*, makes an almost quarter turn on the outer movable plate 113, and extends to the coupling portion between the outer movable plate 113 and a first outer torsion bar 120*a*. The outer driving coil portions 135*a* and 135*b* are spatially separated from each other on the lower left portion (second portion), of the four portions (first, second, third, and fourth portions) of the outer movable plate 113 divided into four portions with reference to first and second axes A1 and A2, which is located between the first inner torsion bar 121*a* and the second outer torsion bar 120*b*, and on the upper right portion (third portion) of the four portions of the outer movable plate 113, which is located between the second inner torsion bar 121*b* and the first outer torsion bar 120*a*.

An outer driving coil wiring 131 includes two end wiring portions 131*a* and 131*b* respectively extending from that end portion of the second coil portion 135*b* which is located near the first outer torsion bar 120*a* and that end portion of the first coil portion 135*a* which is located near the second outer torsion bar 120*b*, and an intermediate wiring portion 131*c* that connects that end portion of the second coil portion 135*b* which is located near the second inner torsion bar 121*b* to that end portion of the first coil portion 135*a* which is located near the second inner torsion bar 121*b*. The two end wiring portions 131*a* and 131*b* extend to the frame 114 through the first and second outer torsion bars 120*a* and 120*b*, respectively. The end portions of the two end wiring portions 131*a* and 131*b* are electrically connected to electrode pads 132*a* and 132*b* on the frame 114, respectively. The intermediate wiring portion 131*c* runs through the first inner torsion bar 121*a*, an inner movable plate 112, and the second inner torsion bar 121*b* and connects the first coil portion 135*a* to the second coil portion 135*b*.

As in the first embodiment, an inner driving coil 136 extends from the coupling portion between the inner movable plate 112 and the first inner torsion bar 121*a*, runs around on the inner movable plate 112, and extends to the coupling portion between the inner movable plate 112 and the second inner torsion bar 121*b*.

An inner driving coil wiring 133 includes a first wiring portion 133*a* extending from one end portion of the inner driving coil 136 and a second wiring portion 133*b* extending from the other end portion of the inner driving coil 136. The first wiring portion 133*a* runs through the first inner torsion bar 121*a*, makes an almost quarter turn (¼ turn) on the outer movable plate 113, and extends to a frame 114 through the first outer torsion bar 120*a*. The second wiring portion 133*b* runs through the second inner torsion bar 121*b*, makes an almost quarter turn on the outer movable plate 113, and extends to the frame 114 through the second outer torsion bar 120*b*. Therefore, the inner driving coil wiring 133 is positioned on portions, of the four portions (first, second, third, and fourth portions) of the outer movable plate 113 divided into four portions with reference to first and second axes A1 and A2, which are diagonally adjacent to each other. That is, the inner driving coil wiring 133 is located on the upper left portion (first portion) of the four portions, which is located between the first inner torsion bar 121*a* and the first outer torsion bar 120*a*, and the lower right portion (fourth portion) of the four portions, which is located between the second inner torsion bar 121*b* and the second outer torsion bar 120*b*. The end portions of the first and second wiring portions 133*a* and 133*b* are electrically connected to the electrode pads 134*a* and 134*b* on the frame 114, respectively.

As in the first embodiment, a lower base 102 is provided with two permanent magnets 104*a* and 104*b*. The lower base 102 includes two members (back yokes) 105*a* and 105*b*, which hold the permanent magnets 104*a* and 104*b*, respectively. The permanent magnets 104*a* and 104*b* for driving the outer movable plate are joined to the back yokes 105*a* and 105*b*, respectively, so as to be arranged between the frame 114 and the outer movable plate 113. The permanent magnets 104*a* and 104*b* and the back yokes 105*a* and 105*b* constitute outer movable plate driving magnetic field generating means or an outer movable plate driving magnetic field generator for generating a magnetic field that is substantially parallel to the second axis A2 and crosses the outer movable plate.

In this embodiment, the permanent magnets 104*a* and 104*b* and the back yokes 105*a* and 105*b* are respectively positioned outside, along the second axis A2, the lower left portion (second portion), of the four portions (first, second, third, and fourth portions) of the outer movable plate 113 divided into four portions with reference to the first and second axes A1 and A2, which is located between the first inner torsion bar 121*a* and the second outer torsion bar 120*b* and on which the first coil portion 135*a* runs, and outside the upper right portion (third portion), which is located between the second inner torsion bar 121*b* and the first outer torsion bar 120*a* and on which the second coil portion 135*b* runs. The permanent magnets 104*a* and 104*b* and the back yokes 105*a* and 105*b* extend generally parallel to those portions of the outer driving coil 135 which extend generally parallel to the first axis A1.

The lower base 102 further include two members (front yokes) 137*a* and 137*b*, which are located inside the outer movable plate 113 so as to face the permanent magnets 104*a* and 104*b* for driving the outer movable plate through the outer movable plate 113.

In the present embodiment, a direction of a current flowing the lower left portion (second portion), on which the first coil portion 135*a* runs, and a direction of a current flowing the upper right portion (third portion), on which the second coil portion 135*b* runs, are the same. If the direction of the current flowing the first coil portion 135*a* is upward (a direction that is directed from the second portion to the first portion), the direction of the current flowing the second coil portion 135*b* is also upward (a direction that is directed from the fourth portion to the third portion). Therefore, the permanent magnets 104*a* and 104*b* for driving the outer movable plate are located so that a line perpendicular to the magnetization direction (a direction in which, for example, as shown in FIG. 14, the back yoke sides of the permanent magnets 104*a* and 104*b* are the S pole and the outer movable plate 113 sides of the permanent magnets 104*a* and 104*b* are the N pole) is generally parallel to an axis connecting the outer torsion bars 120*a* and 120*b*.

In this embodiment, the inner movable plate driving magnetic field generator has the same arrangement as that of the first embodiment. That is, the inner movable plate driving magnetic field generator comprises permanent magnets 106*a* and 106*b* and back yokes 107*a* and 107*b*, which are arranged in the same manner as in the first embodiment.

The optical deflector of this embodiment is operated in the same manner as in the first embodiment. That is, when AC currents (or DC currents) are supplied to the outer driving coil wiring 131 and outer driving coil 135, the outer movable plate 113 oscillates (or tilts) on the outer torsion bars 120*a* and 120*b* as axes owing to the interaction between the current flowing in the outer driving coil 135 and the magnetic fields of the permanent magnets 104*a* and 104*b*. When AC currents (or DC currents) are supplied to the inner driving coil wiring 133 and inner driving coil 136, the inner movable plate 112 oscillates (or tilts) on the inner torsion bars 121*a* and 121*b* as axes owing to the interaction between the current flowing in the inner driving coil 136 and the magnetic fields of the permanent magnets 106*a* and 106*b*.

In the optical deflector of this embodiment as well, in brief, the inner driving coil wiring 133 extends on the outer movable plate 113 so as to avoid the magnetic fields generated by the permanent magnets 104*a* and 140*b* for driving the outer movable plate. In other words, the inner driving coil wiring 133 is placed on those portions of the outer movable plate 113 which are generally parallel to an axis (first axis A1) connecting the outer torsion bars 120*a* and 120*b* and do not directly face the permanent magnets 104*a* and 140*b* for driving the outer movable plate (i.e., those portions of the outer movable plate 113 which are farther from the permanent magnets 104*a* and 104*b*). For this reason, the magnetic fields generated by the permanent magnets 104*a* and 104*b* do not act on the inner driving coil wiring 133. The outer movable plate 113 is therefore driven without being affected by the current flowing in the inner driving coil wiring 133. That is, the outer movable plate 113 and inner movable plate 112 can be driven independently of each other.

More specifically, the outer driving coil 135 is positioned on the two portions (the lower left portion and upper right portion), of the four portions of the outer movable plate 113 divided into four portions with reference to first and second axes A1 and A2, which are diagonally adjacent to each other. In addition, the permanent magnets 104*a* and 104*b* for driving the outer movable plate are located outside these portions (the lower left portion and upper right portion) of the outer movable plate 113. Furthermore, the inner driving coil wiring 133 is positioned on the two remaining portions (the upper left portion and lower right portion) of the four portions of the outer movable plate 113, which are diagonally adjacent to each other.

That is, although the inner driving coil wiring 133 runs on the outer movable plate 113, it runs through the portions that are not easily affected by the magnetic fields of the permanent magnets 104*a* and 104*b*. Therefore, the Lorentz force acting on the outer movable plate 113 is generated by only the interaction between the current flowing in the outer driving coil 135 and the magnetic fields of the permanent magnets 104*a* and 104*b*.

In this embodiment, as in the modification to the first embodiment, the front yokes 137*a* and 137*b* constitute a perfect magnetic circuit, together with the permanent magnets 104*a* and 140*b*. For this reason, the magnetic flux hardly leaks inward from the front yokes 137*a* and 137*b* (on the inner movable plate 112 side). This makes it possible to drive the outer movable plate 113 with high driving precision without much influence of drive crosstalk. The magnetic field is high near the permanent magnets 104*a* and 104*b* and rapidly decreases with an increase in distance from the permanent magnets even in the absence of the front yokes 137*a* and 137*b*. Therefore, although the inner driving coil wiring 133 runs on the outer movable plate 113, the Lorentz force acting on the outer movable plate 113 has very little influence on the oscillation of the outer movable plate 113 in the portions through which the inner driving coil wiring 133 runs. This makes it possible to accurately drive the outer movable plate 113 in the two-dimensional driving operation of driving both the inner movable plate 112 and the outer movable plate 113 as in the first embodiment. In other words, these plates can be two-dimensionally driven independently of each other without much influence of drive crosstalk. In addition, the two permanent magnets 104*a* and 104*b* are arranged point-symmetrically with respect to the central position of the inner movable plate 112 on the oscillation axis of the outer movable plate 113 that extends through the outer torsion bars 120*a* and 120*b*. For this reason, the locus of the oscillation of the outer movable plate 113 is almost symmetrical with respect to the center of the movable plate, and unnecessary resonance or the like does not easily occur. In addition, the number of turns of the outer driving coil 135 remains the same in the two portions of the outer movable plate 113 divided into two portion with reference to the first axis A1. This makes it possible to drive the outer movable plate 113 in a balanced manner.

Although the embodiments of the present invention have been described with reference to the views of the accompanying drawing, the present invention is not limited to these embodiments, and various modifications and changes thereof can be made within the spirit and scope of the invention.

In the first, third, and fourth embodiments, the permanent magnets 104*a* and 104*b* for driving the outer movable plate are positioned on the two sides of the outer movable plate 113 with respect to the first axis A1, which is the oscillation axis of the outer movable plate 113. It is preferable, in terms of the operation characteristics of deflection (oscillating or tilting) of the outer movable plate 113, to position the permanent magnets 104*a* and 104*b* on the two sides of the outer movable plate 113 in this manner. Depending on applications, however, one of the permanent magnets 104*a* and 104*b* may be omitted. This can also apply to the permanent magnets 106*a* and 106*b* for driving the inner movable plate. That is, in the first to fourth embodiments, one of the permanent magnets 106*a* and 106*b* may be omitted depending on applications.

In addition, in the first to fourth embodiments, those portions of the frame which are parallel to the first axis A1 may be omitted. In this case, since the restrictions in the direction of thickness of the permanent magnets and back yokes, which are used to drive the outer movable plate, are eased, the optical deflector can be easily manufactured as compared with the case wherein those portions of the frame which are parallel to the first axis A1 exist.

In the first to fourth embodiments, the torsion bar extends on a substantially straight line, but the configuration is not limited to that. The torsion bar may have a coil spring configuration or an "S" shape. In this case, torsional stiffness of the torsion bar is reduced, so that a large driven angle is obtained with a small current.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electromagnetic-driven two-dimensional optical deflector having a first axis and a second axis, which are substantially perpendicular to each other, comprising:

a support;

a frame-like outer movable plate positioned inside the support;

two outer torsion bars connecting the support to the outer movable plate, the two outer torsion bars extending along the first axis;

an inner movable plate positioned inside the outer movable plate, the inner movable plate having a reflecting surface; and two inner torsion bars connecting the outer movable plate to the inner movable plate, the two inner torsion bars extending along the second axis, the outer torsion bars being capable of twisting about the first axis, so as to allow the outer movable plate to oscillate about the first axis with respect to the support, and the inner torsion bars being capable of twisting about the second axis, so as to allow the inner movable plate to oscillate about the second axis with respect to the outer movable plate, thereby allowing a direction of the reflecting surface of the inner movable plate to be two-dimensionally changed, the optical deflector further comprising:

an outer driving coil provided on the outer movable plate;

an outer movable plate driving magnetic field generator that generates a magnetic field that is substantially parallel to the second axis and crosses the outer movable plate;

an inner driving coil provided on the inner movable plate;

an inner movable plate driving magnetic field generator that generates a magnetic field that is substantially parallel to the first axis and crosses the inner movable plate;

an outer driving coil wiring electrically connected to the outer driving coil; and an inner driving coil wiring electrically connected to the inner driving coil, the inner driving coil wiring extending on the outer movable plate so as to avoid a magnetic field generated by the outer movable plate driving magnetic field generator;

wherein the two outer torsion bars comprise a first outer torsion bar and a second outer torsion bar and the two inner torsion bars comprise a first inner torsion bar and a second inner torsion bar and the outer driving coil extends from a coupling portion between the outer movable plate and the first outer torsion bar and runs on the outer movable plate to extend to a coupling portion between the outer movable plate and the second outer torsion bar, the outer driving coil wiring has two wiring portions extending from two ends of the outer driving coil, the wiring portions run through the first outer torsion bar and the second outer torsion bar, respectively, and extend to the support, the inner driving coil extends from a coupling portion between the inner movable plate and the first inner torsion bar, runs around on the inner movable plate, and extends to a coupling portion between the inner movable plate and the second inner torsion bar, the inner driving coil wiring has a first wiring portion extending from one end portion of the inner driving coil and a second wiring portion extending from the other end portion of the inner driving coil, the first wiring portion runs through the first inner torsion bar, makes a substantially quarter turn on the outer movable plate, and extends to the support through the first outer torsion bar, the second wiring portion runs through the second inner torsion bar, makes a substantially quarter turn on the outer movable plate, and extends to the support through the second outer torsion bar, so that, of first, second, third, and fourth portions of the outer movable plate divided into four portions with reference to the first axis and the second axis, the inner driving coil wiring is positioned on the first portion between the first inner torsion bar and the first outer torsion bar and the fourth portion between the second inner torsion bar and the second outer torsion bar, the first and fourth portions being positioned diagonally, and the outer movable plate driving magnetic field generator has two permanent magnets, which are located outside along the second axis the second portion between the first inner torsion bar and the second outer torsion bar and outside along the second axis the third portion between the second inner torsion bar and the first outer torsion bar, respectively, and extend substantially parallel to portions of the outer driving coil extending substantially parallel to the first axis, respectively.

2. A deflector according to claim 1, further comprising magnetic members that are located inside the outer movable plate so as to face the permanent magnets of the outer movable plate driving magnetic field generator through the outer movable plate, respectively.

3. An electromagnetic-driven two-dimensional optical deflector having a first axis and a second axis, which are substantially perpendicular to each other, comprising:

a support;

a frame-like outer movable plate positioned inside the support;

two outer torsion bars connecting the support to the outer movable plate, the two outer torsion bars extending along the first axis;

an inner movable plate positioned inside the outer movable plate, the inner movable plate having a reflecting surface; and two inner torsion bars connecting the outer movable plate to the inner movable plate, the two inner torsion bars extending along the second axis, the outer torsion bars being capable of twisting about the first axis, so as to allow the outer movable plate to oscillate about the first axis with respect to the support, and the inner torsion bars being capable of twisting about the second axis, so as to allow the inner movable plate to oscillate about the second axis with respect to the outer movable plate, thereby allowing a direction of the reflecting surface of the inner movable plate to be two-dimensionally changed, the optical deflector further comprising:

an outer driving coil provided on the outer movable plate;

outer movable plate driving magnetic field generating means for generating a magnetic field that is substantially parallel to the second axis and crosses the outer movable plate;

an inner driving coil provided on the inner movable plate;

inner movable plate driving magnetic field generating means for generating a magnetic field that is substantially parallel to the first axis and crosses the inner movable plate;

an outer driving coil wiring electrically connected to the outer driving coil; and an inner driving coil wiring electrically connected to the inner driving coil, the inner driving coil wiring extending on the outer movable plate so as to avoid a magnetic field generated by the outer movable plate driving magnetic field generating means;

wherein the two outer torsion bars comprise a first outer torsion bar and a second outer torsion bar and the two inner torsion bars comprise a first inner torsion bar and a second inner torsion bar and the outer driving coil extends from a coupling portion between the outer movable plate and the first outer torsion bar and runs on the outer movable plate to extend to a coupling portion between the outer movable plate and the second outer torsion bar, the outer driving coil wiring has two wiring portions extending from two ends of the outer driving coil, the wiring portions run through the first outer torsion bar and the second outer torsion bar, respectively, and extend to the support, the inner driving coil extends from a coupling portion between the inner movable plate and the first inner torsion bar, runs around on the inner movable plate, and extends to a coupling portion between the inner movable plate and the second inner torsion bar, the inner driving coil wiring has a first wiring portion extending from one end portion of the inner driving coil and a second wiring portion extending from the other end portion of the inner driving coil, the first wiring portion runs through the first inner torsion bar, makes a substantially quarter turn on the outer movable plate, and extends to the support through the first outer torsion bar, the second wiring portion runs through the second inner torsion bar, makes a substantially quarter turn on the outer movable plate, and extends to the support through the second outer torsion bar, so that, of first, second, third, and fourth portions of the outer movable plate divided into four portions with reference to the first axis and the second axis, the inner driving coil wiring is positioned on the first portion between the first inner torsion bar and the first outer torsion bar and the fourth portion between the second inner torsion bar and the second outer torsion bar, the first and fourth portions being positioned diagonally, and the outer movable plate driving magnetic field generating means has two permanent magnets, which are located outside along the second axis the second portion between the first inner torsion bar and the second outer torsion bar and outside along the second axis the third portion between the second inner torsion bar and the first outer torsion bar, respectively, and extend substantially parallel to portions of the outer driving coil extending substantially parallel to the first axis, respectively.

4. A deflector according to claim 3, further comprising magnetic members that are located inside the outer movable plate so as to face the permanent magnets for driving the outer movable plate through the outer movable plate, respectively.

* * * * *